United States Patent
Blood et al.

(10) Patent No.: US 12,149,073 B2
(45) Date of Patent: Nov. 19, 2024

(54) DYNAMIC CAPABILITY REGION FOR ELECTRIC POWER SYSTEM PROTECTION

(71) Applicant: Schweitzer Engineering Laboratories, Inc., Pullman, WA (US)

(72) Inventors: Ellery A. Blood, Moscow, ID (US); Scott M. Manson, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 469 days.

(21) Appl. No.: 17/661,390

(22) Filed: Apr. 29, 2022

(65) Prior Publication Data

US 2022/0407311 A1   Dec. 22, 2022

Related U.S. Application Data

(60) Provisional application No. 63/213,295, filed on Jun. 22, 2021.

(51) Int. Cl.
  *H02J 3/00* (2006.01)
  *H02J 3/32* (2006.01)

(52) U.S. Cl.
  CPC ............ *H02J 3/003* (2020.01); *H02J 3/322* (2020.01)

(58) Field of Classification Search
  CPC ........... H02J 3/003; H02J 3/322; H02J 3/1821
  See application file for complete search history.

(56) References Cited

U.S. PATENT DOCUMENTS

| | | |
|---|---|---|
| 2,917,672 A | 12/1959 | Tremaine |
| 4,029,951 A | 6/1977 | Berry |
| 4,148,087 A | 4/1979 | Phadke |
| 4,245,182 A | 1/1981 | Aotsu |
| 5,264,778 A | 11/1993 | Kimmel |
| 5,321,308 A | 6/1994 | Johncock |
| 5,519,300 A | 5/1996 | Leon |
| 5,581,470 A | 12/1996 | Pawloski |
| 5,592,393 A | 1/1997 | Yalla |

(Continued)

FOREIGN PATENT DOCUMENTS

WO   2002039642   5/2002

OTHER PUBLICATIONS

Robin Brooks, Alan Mahoney, John Wilson, Na Zhao, "New Alarms and Alerts from Operating Envelopes Drive Economic Benefits as well as Safer Processes" Hazards XXII, Symposium Series No. 156, 2011, pp. 298-307, IChemE.

(Continued)

*Primary Examiner* — Nicholas Klicos
(74) *Attorney, Agent, or Firm* — Stoel Rives, LLP

(57) ABSTRACT

This disclosure discusses systems, methods, and techniques for producing and utilizing a capability region of one or more monitored equipment. To do so, an intelligent electronic device (IED) may access a data set of one or more known performance characteristics of the monitored equipment. The known performance characteristics are based on, or dependent of, one or more variables. The IED may also access a constraint library with geometric primitives. Then, the IED may analyze the data set and may produce the capability region using the geometric primitive. The IED may compare an operating point of the monitored equipment to the capability region of the monitored equipment. Based on the comparison, the IED may implement a control action.

20 Claims, 11 Drawing Sheets

(56) References Cited

U.S. PATENT DOCUMENTS

| | | |
|---|---|---|
| 5,805,395 A | 9/1998 | Hu |
| 6,204,642 B1 | 3/2001 | Lawson |
| 6,294,898 B2 | 9/2001 | Lawson |
| 6,492,801 B1 | 12/2002 | Sims |
| 6,525,504 B1 | 2/2003 | Nygren |
| 6,794,879 B2 | 9/2004 | Lawson |
| 6,839,207 B2 | 1/2005 | Folliot |
| 6,924,565 B2 | 8/2005 | Wilkins |
| 6,924,628 B2 | 8/2005 | Thompson |
| 6,975,946 B2 | 12/2005 | Al-Hamrani |
| 7,006,935 B2 | 2/2006 | Seki |
| 7,190,149 B2 | 3/2007 | Huff |
| 7,385,300 B2 | 6/2008 | Huff |
| 7,710,693 B2 | 5/2010 | Guzman-Casillas |
| 7,856,327 B2 | 12/2010 | Schweitzer |
| 8,080,887 B2 | 12/2011 | Radl |
| 8,321,162 B2 | 11/2012 | Labuschagne |
| 8,405,940 B2 | 3/2013 | Schweitzer |
| 8,405,944 B2 | 3/2013 | Donolo |
| 8,706,309 B2 | 4/2014 | Schweitzer |
| 8,792,217 B2 | 7/2014 | Shah |
| 8,965,592 B2 | 2/2015 | Manson |
| 9,008,850 B2 | 4/2015 | Manson |
| 9,128,130 B2 | 9/2015 | Seeley |
| 9,128,140 B2 | 9/2015 | Fischer |
| 9,164,148 B2 | 10/2015 | Klingel |
| 9,496,707 B2 | 11/2016 | Thompson |
| 9,548,693 B2 | 1/2017 | Hyypio |
| 9,798,342 B2 | 10/2017 | Gubba Ravikumar |
| 9,898,062 B2 | 2/2018 | Shah |
| 9,906,041 B2 | 2/2018 | Ravikumar |
| 9,912,158 B2 | 3/2018 | Ravikumar |
| 9,964,984 B2 | 5/2018 | Converse |
| 9,988,135 B2 | 6/2018 | Converse |
| 10,135,250 B2 | 11/2018 | Manson |
| 10,288,688 B2 | 5/2019 | Kasztenny |
| 10,310,480 B2 | 6/2019 | Manson |
| 10,312,694 B2 | 6/2019 | Manson |
| 10,333,291 B2 | 6/2019 | Chowdhury |
| 10,381,835 B1 | 8/2019 | Gubba Ravikumar |
| 10,476,268 B2 | 11/2019 | Gubba Ravikumar |
| 10,570,882 B2 | 2/2020 | Hardwicke, Jr. |
| 10,797,632 B2 | 10/2020 | Chowdhury |
| 10,819,261 B1 | 10/2020 | Chowdhury |
| 10,931,097 B2 | 2/2021 | Chowdhury |
| 11,169,189 B2 | 11/2021 | Baone |
| 11,196,369 B2 | 12/2021 | Alla |
| 11,316,455 B2 | 4/2022 | Alla |
| 11,631,972 B2 | 4/2023 | Chowdhury |
| 2001/0001534 A1 | 5/2001 | Lawson |
| 2002/0128759 A1 | 9/2002 | Sodoski |
| 2005/0033481 A1 | 2/2005 | Budhraja |
| 2009/0125158 A1 | 5/2009 | Schweitzer |
| 2010/0002348 A1 | 1/2010 | Donolo |
| 2010/0049486 A1 | 2/2010 | Xu |
| 2010/0071889 A1 | 3/2010 | Radl |
| 2010/0125373 A1 | 5/2010 | Labuschagne |
| 2011/0085272 A1 | 4/2011 | Schweitzer |
| 2014/0371929 A1 | 12/2014 | Allen |
| 2015/0244170 A1 | 8/2015 | Bartlett |
| 2016/0041567 A1 | 2/2016 | Ko Thet |
| 2018/0196585 A1* | 7/2018 | Densham ............... H04N 9/31 |
| 2019/0155227 A1* | 5/2019 | Song ................ H02J 13/00004 |
| 2020/0348364 A1* | 11/2020 | Guo ..................... G01R 31/367 |

OTHER PUBLICATIONS

Jong-Yong Park, Nakwan Kim "Design of a safety operational envelope protection system for a submarine," Ocean Engineering, vol. 148, Jan. 15, 2018, pp. 602-611, from https://doi.org/10.1016/j.oceaneng.2017.11.016.

* cited by examiner

FIG. 3C Legend

- - - - - - - First Semicircle 306-3
— · — Second Semicircle 308-3
———— First Rhombus 314-3, Second Rhombus 316-3, and Second Rectangle 318-3
— — First Rectangle 312-3
△ △ △ Dynamic Capability Region 320-3 (DCR 320-3)

US 12,149,073 B2

DYNAMIC CAPABILITY REGION FOR ELECTRIC POWER SYSTEM PROTECTION

RELATED APPLICATION

This application claims the benefit under 35 U.S.C. § 119(e) of U.S. Provisional Application No. 63/213,295 filed Jun. 22, 2021, which is hereby incorporated by reference herein in its entirety.

TECHNICAL FIELD

The present disclosure generally relates to producing a capability region of a system and/or a process. More particularly, this disclosure relates to producing a dynamic capability region of the system and/or a process.

BRIEF DESCRIPTION OF THE SEVERAL VIEWS OF THE DRAWINGS

Additional aspects and advantages will be apparent from the following detailed description of preferred embodiments, which proceeds with reference to the accompanying drawings, in which.

Figure 1:
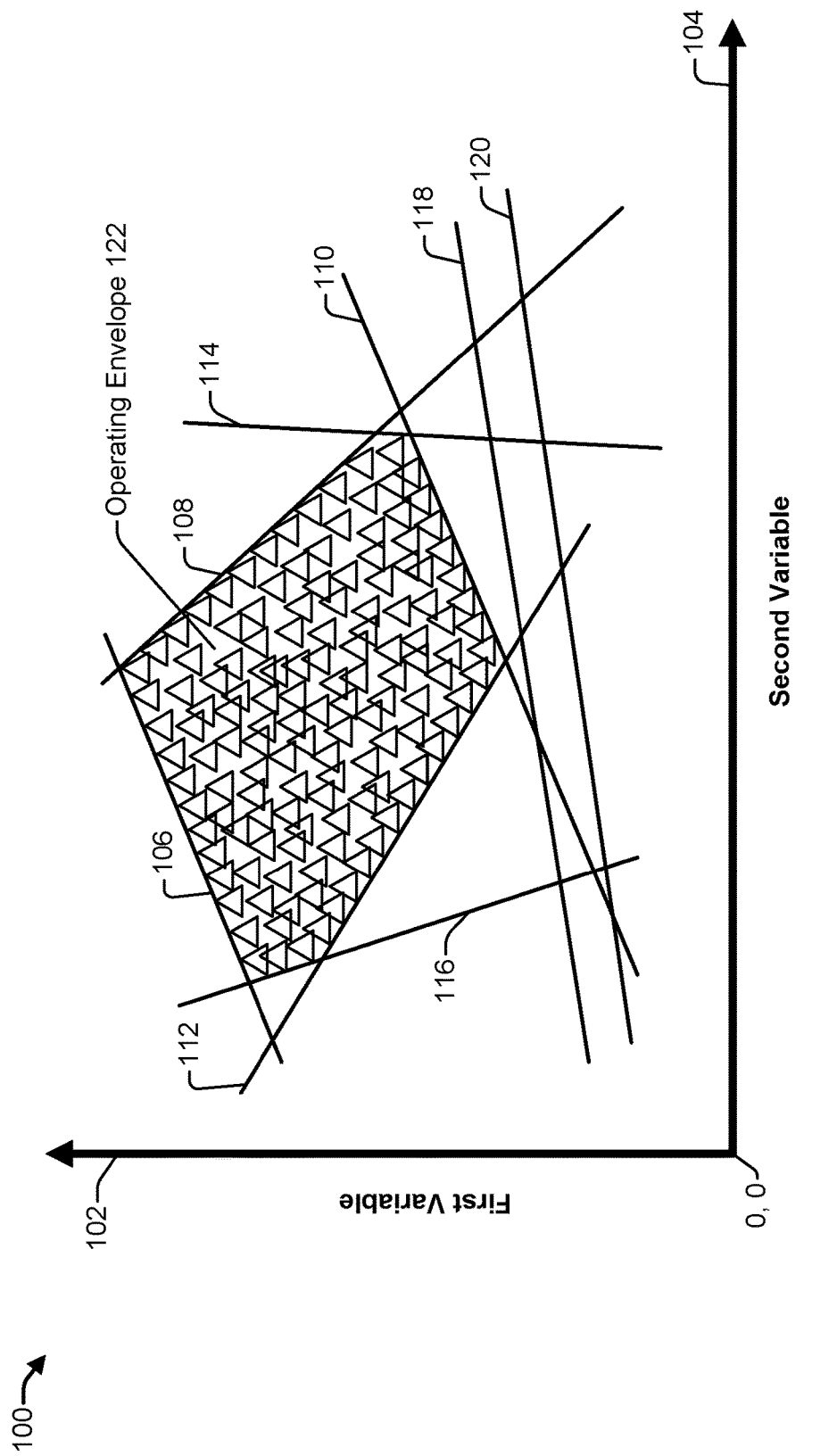
FIG. 1 illustrates an operating envelope of a process, the operating envelope of the process is produced using intersections of straight lines, according to one embodiment.

To easily identify the discussion of any particular element or act, the most significant digit or digits in a reference number refer to the figure number in which that element is first introduced.

DETAILED DESCRIPTION

This disclosure discusses systems, methods, and techniques for producing and utilizing a capability region of a process, a system (e.g., an electrical power system), a microgrid, an electrical device, an electric machine, an apparatus, and/or so forth.

According to one embodiment, a system may produce a capability region of at least one monitored equipment. The system may include an intelligent electronic device (IED) that utilizes at least one least one computer-readable medium and at least one processor to access a data set of a plurality of known performance characteristics of the monitored equipment based on a plurality of variables. The IED may also access a constraint library comprising a plurality of geometric primitives. Further, the system and/or the IED of the system may utilize a capability region module. The capability region module may be configured to analyze the data set and produce the capability region of the monitored equipment by using one or more geometric primitives of the plurality of geometric primitives. For clarity, the capability region of the monitored equipment may include one or more constraints. After producing the capability region of the monitored equipment, the system and/or the IED of the system may utilize a response module. The response module may be configured to determine an operating point of the monitored equipment by using one or more variables of the plurality of variables, and the response module may also be configured to compare the operating point of the monitored equipment with the capability region of the monitored equipment. Based on the comparison, the system and/or the IED of the system may utilize a control module that may be configured to implement a control action, as is further described below.

According to some embodiments, a computer-implemented method may include producing a capability region of one or more monitored equipment. The computer-implemented method may access a data set of a plurality of known performance characteristics of the monitored equipment based on a plurality of variables. The computer-implemented method may also access a constraint library with a plurality of geometric primitives. Then, the computer-implemented method may analyze the data set to produce the capability region of the monitored equipment by, for example, employing the algebra of sets using one or more geometric primitives. In mathematics, the algebra of sets may define the properties and laws of sets, set-theoretic operations of a union(s), an intersection(s), and a complementation(s), and relations of a set equality(ies) and a set inclusion(s). The algebra of sets may also provide systematic procedures for evaluating expressions, and performing calculations, involving the set-theoretic operations. Furthermore, the set-theoretic operations may form and/or include a Boolean algebra. Thus, in some embodiments, the computer-implemented method may analyze the data set to produce the capability region by performing one or more Boolean operations using one or more geometric primitives. The computer-implemented method may also determine an operating point of the monitored equipment by using one or more variables. The computer-implemented method may then compare the operating point of the monitored equipment with the capability region of the monitored equipment. Finally, based on the comparison, the computer-implemented method may enable a control action, as is further described below.

In some embodiments, a system, an apparatus, a software, modules of the software, an algorithm, a model, means, and/or a combination thereof include performing the computer-implemented method mentioned above. For example, an apparatus may include at least one communication interface to communicate with the monitored equipment using a communication protocol. The apparatus may also include at least one processor and at least one computer-readable medium. The computer-readable medium may include instructions that, responsive to execution by the processor, may cause the apparatus to perform the computer-implemented method mentioned above.

The variables may be any type of variable. For example, in a wastewater treatment process, the variables may be a water flowrate, a water level, a water pressure, a water temperature, a water turbidity, a chlorine level, an oxygen level, and/or so forth. As another example, in an electrical power system (power system), an electrical device, an electric machine, an apparatus, and/or so forth, the variables may be: a temperature (T) (e.g., an air cooling temperature, a liquid cooling temperature, an ambient temperature, device temperature); an instantaneous current (i (t)); a root mean square (RMS) current (I); various fault currents (e.g., subtransient fault current); sequence currents (e.g., $I_0$, $I_1$, $I_2$); a line(s) current ($I_L$); a neutral current ($I_n$); an instantaneous voltage (v(t)); an RMS voltage (V); a line-to-line voltage(s) ($V_{LL}$); a line-to-neutral voltage(s) ($V_{Ln}$); a first magnitude of the instantaneous current that is in phase with the instantaneous voltage (a direct current), where the direct may be denoted as $I_d$; a second magnitude of the instantaneous current that is out of phase regarding the instantaneous voltage, for example, 90 degrees (or a quadrature current), where the quadrature current may be denoted as $I_q$; a resistance (R); an inductance (L); a capacitance (C); a reactance (X); an impedance (Z); a conductance (G); a charge (q); a frequency (f); an active, a real, or an average electrical power (real power) (P); a reactive or an imaginary electrical power (reactive power) (Q); a complex electrical power (complex power) (S); an apparent electrical power (apparent power) (|S|), where the apparent power is the absolute value (or magnitude) of the complex power; a power factor (p.f.); time (t); a turbine-governor regulation constant; an electrical torque; a mechanical torque; a net accelerating torque; a permittivity; a reflection or refraction coefficient ($\Gamma$); a magnetic flux; a magnetic flux linkage; and/or so forth.

Generally speaking, a variable may have a value of zero (0), may have a value that is greater or less than zero (0), may be static, may be dynamic, may include real numbers, may include imaginary numbers (e.g., $\sqrt{(-1)}=i$ or $=j$), may include rational numbers (e.g., 10.5), may include irrational numbers (e.g., $\pi$, e), may be a combination thereof, and/or so forth.

In some embodiments, constraints may define a capability region, a dynamic capability region (DCR), a static capability region (SCR), a capability curve (CC), a capability area, an operating region, an operating envelope, and/or so forth. Note that the DCR may also be described as an adaptive and/or adjustable capability region.

The phrases "coupled to," "connected to," and "in communication with" may refer to any form of interaction between two or more components, including mechanical, electrical, magnetic, and electromagnetic interaction. Two components may be connected to each other, even though they are not in direct contact with each other, and even though there may be intermediary devices between the two components.

Aspects of certain embodiments described herein may be implemented as software modules or components. As used herein, a software module or component may include any type of computer instruction or computer-executable code located within or on a computer-readable storage medium, such as a non-transitory computer-readable medium. A software module may, for instance, comprise one or more physical or logical blocks of computer instructions, which may be organized as a routine, program, object, component, data structure, etc., that perform one or more tasks or implement particular data types, algorithms, and/or methods.

A particular software module may comprise disparate instructions stored in different locations of a computer-readable storage medium, which together implement the described functionality of the module. Indeed, a module may comprise a single instruction or many instructions, and may be distributed over several different code segments, among different programs, and across several computer-readable storage media. Some embodiments may be practiced in a distributed computing environment where tasks are performed by a remote processing device linked through a communications network. In a distributed computing environment, software modules may be located in local and/or remote computer-readable storage media. In addition, data being tied or rendered together in a database record may be resident in the same computer-readable storage medium, or across several computer-readable storage media, and may be linked together in fields of a record in a database across a network.

The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments. In addition, the steps of a method do not necessarily need to be executed in any specific order, or even sequentially, nor need the steps be executed only once, unless otherwise specified. Further, while the various aspects of the embodiments are presented in drawings, the drawings are not necessarily drawn to scale, unless specifically indicated.

FIG. 1 illustrates an example process 100 having an operating envelope 122, according to one embodiment. The process 100 may depend on a first variable 102 (e.g., a first process variable, PV1) and a second variable 104 (e.g., a second process variable, PV2). The first and the second variables 102, 104 may be any type of variable.

In one embodiment, the process 100 may include a first linear constraint 106 (constraint 106), a second linear constraint 108 (constraint 108), a third linear constraint 110 (constraint 110), a fourth linear constraint 112 (constraint 112), a fifth linear constraint 114 (constraint 114), a sixth linear constraint 118 (constraint 118), and a seventh linear constraint 120 (constraint 120). As described in this disclosure, a linear constraint may refer to a mathematical representation (e.g., an equation, a system of linear equations, a matrix, and/or so forth) of a line in a two-dimensional (2D) space, a plane in a three-dimensional (3D) space, and/or a hyper-plane in a greater-than-3D space.

In FIG. 1, the constraints 106 to 120 define the operating envelope 122 of the process 100. The constraints of FIG. 1 may have different weights (or importance) regarding the operating envelope 122 of the process 100. For example, in FIG. 1, the constraints 106, 108, 110, and 112 have a considerable weight because constraints 106, 108, 110, and 112 provide most of the limits for the operating envelope. As another example, in FIG. 1, the constraints 114 and 116 have a reduced weight compared to the constraints 106, 108, 110, and 112 because the constraints 114 and 116 hardly limit the operating envelope 122 of the process 100. As yet another example, in FIG. 1, the constraints 118 and 120 may be redundant constraints because the constraints 118 and 120 are considerably distant from the operating envelope 122.

Similar to the process 100, a myriad of other processes, devices, machines, apparatuses, systems, methods, and/or so forth may operate for prolonged periods of time (e.g., a steady-state period) within a capability region, a DCR, an SCR, a CC, a capability area, an operating region, an operating envelope, and/or so forth.

Alternatively, or additionally, the processes, machines, devices, apparatuses, systems, and/or methods may operate outside the steady-state period for a relatively short duration of time (e.g., a transient period). For example, the constraints 106, 106, 108, 110, 114, and 116 may define a steady-state period of the process 100. As another example, the constraints 106, 108, 110, and 112 may define a transient period of the process 100. As yet another aspect, the area outside the operating envelope 122 of the process 100 may define an unsafe, a prohibited, and/or an unacceptable process.

In FIG. 1, the operating envelope 122 of the process 100 is static (instead of dynamic) and is defined using linear constraints (e.g., lines), and/or may depend on a limited count of variables (e.g., the first variable 102 and the second variable 104). Next, the description focuses on a more complex operating envelope.

Figure 2:
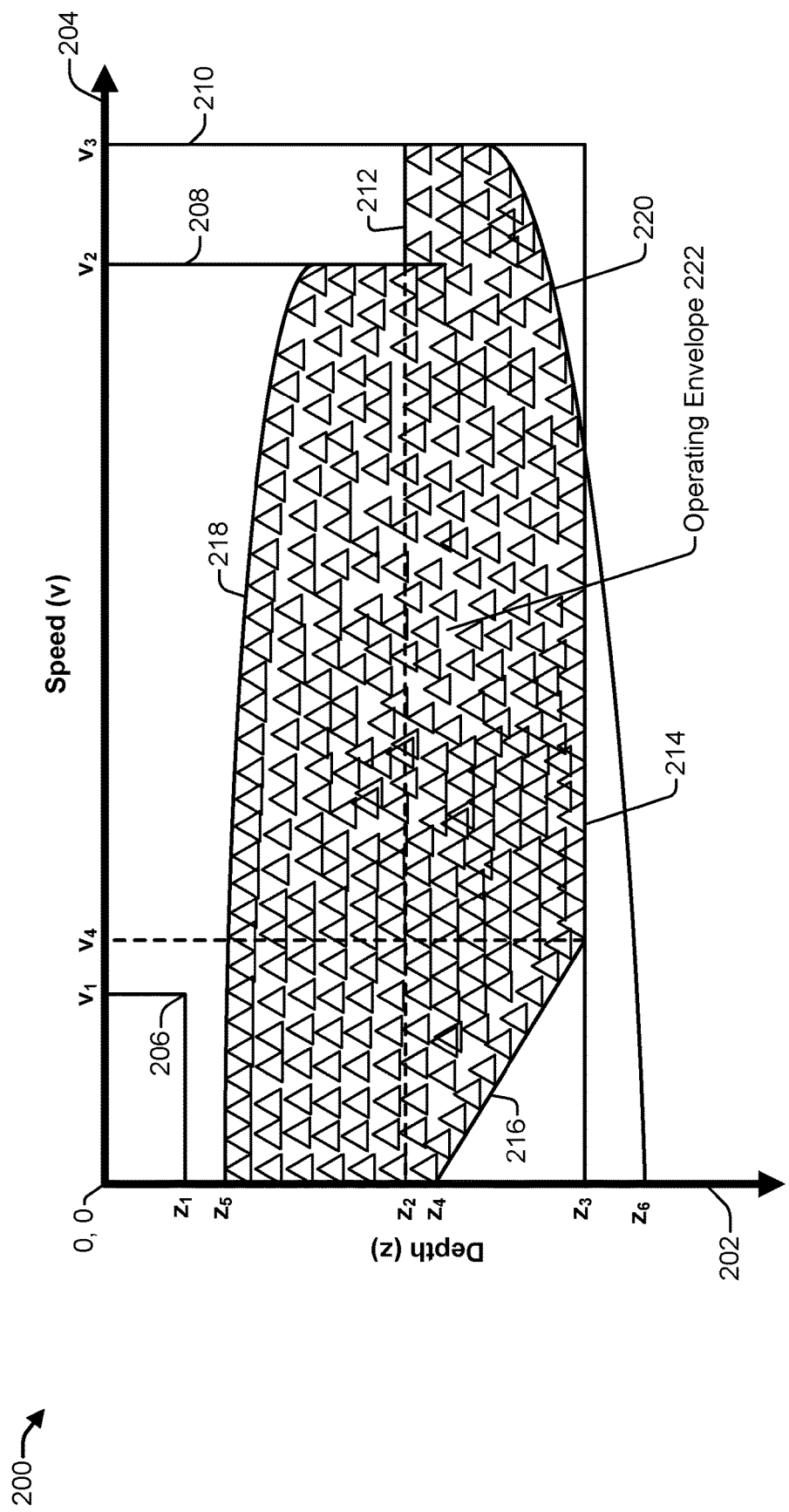
FIG. 2 illustrates an operating envelope of a submarine, the operating envelope of the submarine is produced using intersections of straight lines and/or convex functions, according to one embodiment.

FIG. 2 illustrates a submarine 200 having a safe(ty) operating envelope 222 (operating envelope 222), according to one embodiment. The operating envelope 222 of FIG. 2 is considerably more elaborate, intricate, complex, and/or complicated (e.g., an intricate shape) than the operating envelope 122 of FIG. 1. In detail, a depth (z) 202 and/or a velocity (v) 204 of the submarine 200 may limit one, more than one, and/or all functions of the submarine 200. For example, an operator (e.g., a sailor) may utilize a periscope when the submarine 200 is submerged no deeper than a first depth ($z_1$) and/or traveling no faster than a first velocity ($v_1$). As such, $z_1$ and $v_1$ may help define a first line constraint 206 (constraint 206). The constraint 206 may include two lines that may be mathematically represented with two equations, for example, $v=v_1$, $z=z_1$.

Continuing with FIG. 2, operating the submarine 200 may include additional line constraints, such as:

a second line constraint 208 (constraint 208) that is illustrated as a vertical line (or equation, for example, $v=v_2$) at a second velocity ($v_2$);

a third line constraint 210 (constraint 210) that is illustrated as a vertical line (or equation, for example, $v=v_3$) at a third velocity ($v_3$);

a fourth line constraint 212 (constraint 212) that is illustrated as a horizontal line (or equation, for example, $z=z_2$) at a second depth ($z_2$) between the constraint 208 and the constraint 210;

a fifth line constraint 214 (constraint 214) that is illustrated as a horizontal line (or equation, for example, $z=z_3$) at a third depth ($z_3$); and a sixth line constraint 216 (constraint 216) that is illustrated as a line with a negative slope (or equation, for example, $$z = -\left(\frac{z_4}{v_4}\right) \cdot v - z_4),$$

and the line may be partly defined by a fourth velocity ($v_4$) and a fourth depth ($z_4$).

In addition to the line constraints 208, 210, 212, 214, and 216, operating the submarine 200 may include: a constraint 218 that may be partly defined by a fifth depth ($z_5$) and the constraint 208; and a constraint 220 that may be partly defined by a sixth depth ($z_6$), the constraint 214, and the constraint 210.

As is illustrated by an area with small triangles, the constraints 208, 210, 212, 214, 216, 218, and 220 define the operating envelope 222 of the submarine 200. In some embodiments, producing (and/or represented, defined, implemented) the operating envelope 222 by incorporating intersections of straight lines, convex polygons, concave polygons, and/or other shapes may require custom programming (e.g., custom coding). For example, although the operating envelope 222 of the submarine 200 is fairly intricate, the operating envelope 222 is not dynamic and is defined by constraints with a limited count of shapes (e.g., lines, convex polygons, concave polygons). Further, the operating envelope 222 and the associated custom programming may not be easily reused and/or translated to produce operating envelopes of other systems (e.g., other submarines), processes, machines, devices, apparatuses, and/or methods.

Alternatively, or additionally, an operating envelope may be produced, represented, defined, and/or implemented (collectively may be referred to as "produced") by specifying a list of points (e.g., a library(ies)) that define an outline and/or an area of the operating envelope. By so doing, the shape of the operating envelope may be any arbitrary shape. However, relying on such libraries to produce the operating envelope requires complex algorithms that use considerable computational resources (e.g., processor(s), computer-readable medium(a)). Furthermore, relying on the libraries may not easily enable producing a dynamic operating envelope (e.g., a DCR, a dynamic operating area), without, for example, updating the algorithms and/or the libraries. To this end, this description partly focuses on defining and/or implementing a DCR using "geometric primitives," as is further described herein.

As is described herein, partly with reference to FIGS. 3A, 3B, 3C, 4, 5A, 5B, 5C, 6, and 7, the geometric primitives may be geometric shapes that a system, a process, a machine, a device, an apparatus, a method, and/or so forth may produce. For example, in a 3D space, a geometric primitive may be a cube, a cylinder, a sphere, a cone, a pyramid, a torus, and/or so forth. As another example, in a 2D space, a geometric primitive may be a point, a line, a myriad variety of polygons (e.g., a square, a rectangle, a diamond, a rhombus, a hexagon, a pentagon, and so forth), a circle, a semicircle, a quarter circle, an ellipse, and so forth. Geometric primitives may also include other shapes that may be expressed and/or represented using mathematical functions, such as parabolic, hyperbolic, parabolic, logarithmic, exponential, convex, polynomial functions, and/or so forth. Next, the description focuses on producing (and/or representing, defining, implementing) a DCR of a generator using example geometric primitives.

Figure 3A:
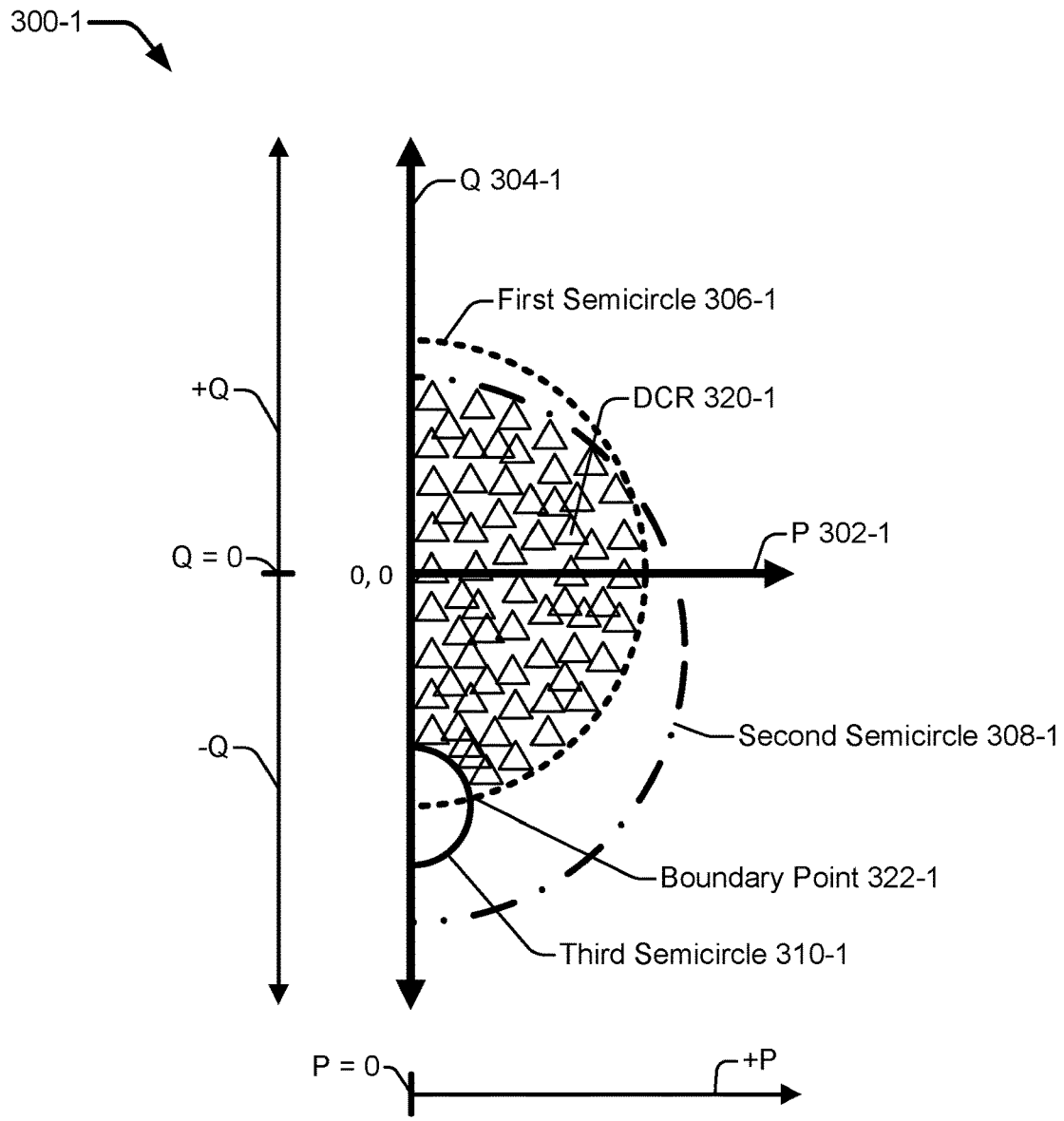
FIG. 3A illustrates a dynamic capability region (DCR) of a generator and/or generator set (collectively, "genset"); the DCR is inside a complex electrical power plane (S-plane), and the DCR is produced using geometric primitives, according to one embodiment.

FIG. 3A illustrates a dynamic capability region 320-1 (DCR 320-1) of a genset, according to one embodiment. The DCR 320-1 is inside a complex power plane 300-1 (S-plane 300-1).

Generally, the genset may publish a steady-state, a transient-state, and/or an unsafe operating limit of the genset. For example, a manufacturer of the genset may publish the steady-state, the transient-state, and/or the unsafe (and/or inadequate) operating limit manual in a human-machine interface (HMI) screen of the genset, an operating manual, and/or so forth. The steady-state, transient-state, and/or the unsafe operating limits may be part of a capability curve or a capability region of the genset. The capability curve and/or the capability region may be defined on a P vs. Q plane (or S-plane). The complex power may be expressed in terms of P and Q, specifically, S=P+jQ, where j is the square root of negative one ($j=\sqrt{(-1)}$). As forementioned, the absolute value (or a magnitude) of the complex power may be referred to as an apparent power (e.g., the apparent power=|S|). P may be measured in Watts (W), Q may be measured in Volt-Ampere reactive (VAr), and |S| may be measured in Volt-Ampere (VA). It is to be understood that P, Q, and |S| may be measured using a derivative of W, VAr, and VA, respectively (e.g., kW, kVAr, and kVA, where k denotes "kilo," 1000, or $10^3$).

Figure 3B:
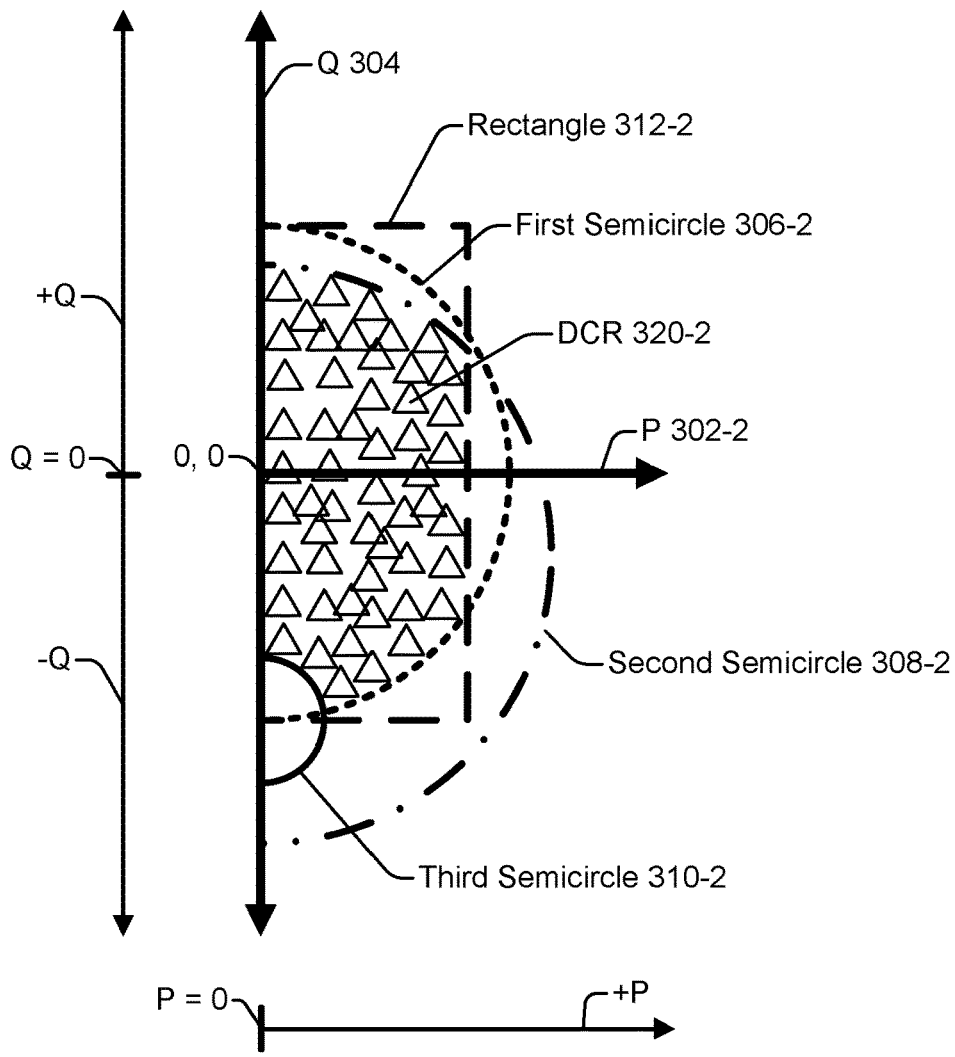
FIG. 3B illustrates another DCR of a genset; the DCR is inside an S-plane, and the DCR is produced using geometric primitives, according to one embodiment.
Figure 3C:
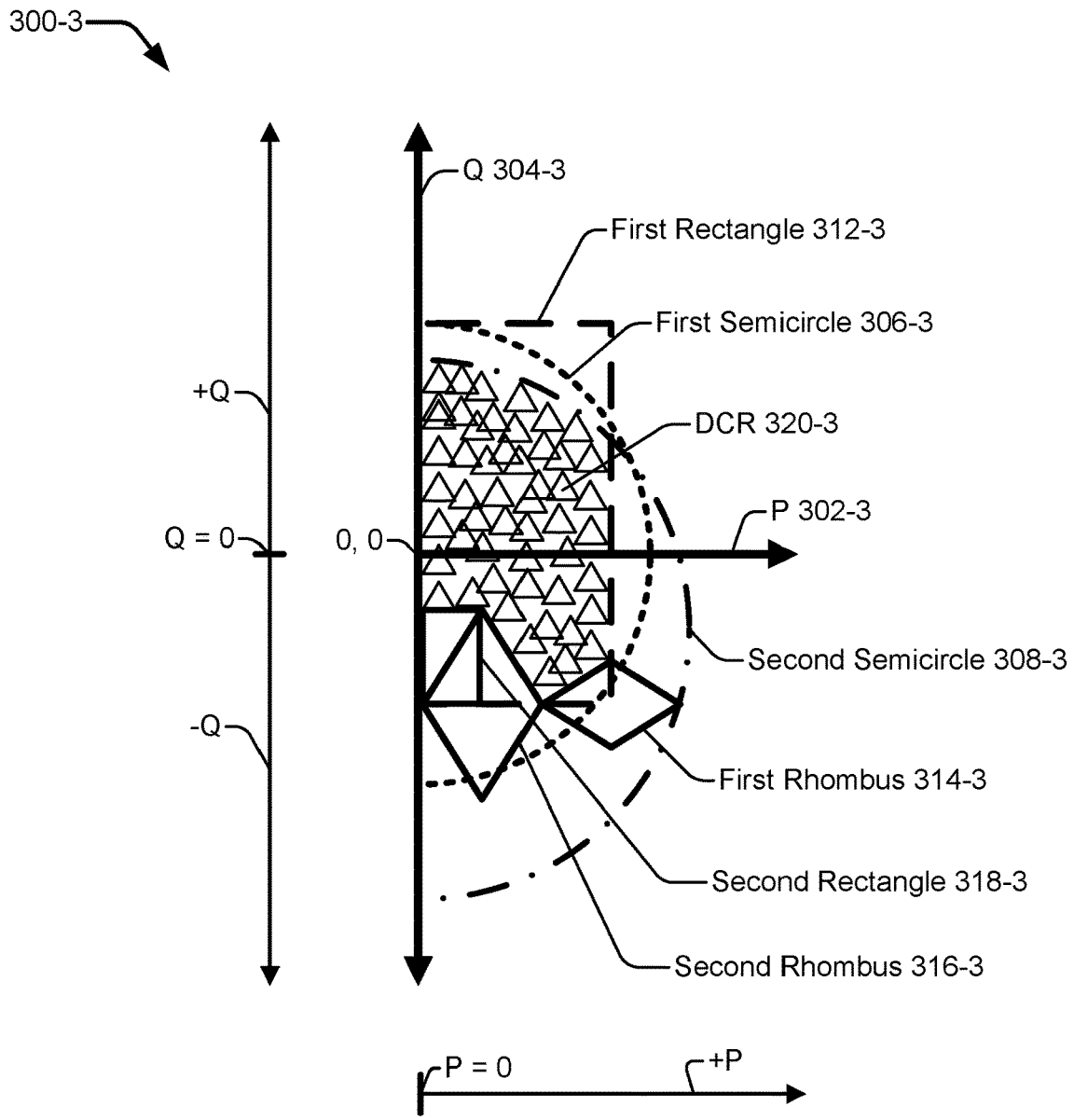
FIG. 3C illustrates another DCR of a genset; the DCR is inside an S-plane, and the DCR is produced using geometric primitives, according to one embodiment.

Regarding a genset (e.g., the genset discussed in relation to FIG. 3A), a positive P may indicate that the genset is producing real power, and the positive P may lie on a right-hand direction of an S-plane (e.g., S-plane 300-1). A negative P may indicate that the genset is consuming real power, and the negative P may lie on a left-hand direction of the S-plane (note that FIGS. 3A, 3B, and 3C only illustrate a positive P). A positive Q may indicate that the genset is producing reactive power, for example, an electrical power that is generally consumed by inductive loads or produced by capacitive loads. The positive Q may lie on an "up" direction of the S-plane, for example, as is illustrated in FIGS. 3A, 3B, and 3C. Lastly, a negative Q may indicate that the generator is consuming reactive power, and the negative Q may lie on a "down" direction of the S-plane, for example, as is illustrated in FIGS. 3A, 3B, and 3C.

As it may become more apparent, producing DCRs by using geometric primitives enables a plug-and-play capability. Further, the geometric primitives enable individual constraints to be independently controlled and/or modified. In one aspect, the DCRs produced by using geometric primitives may have an overall constructive, elaborate, intricate, complicated, and/or complex geometry(ies) (collectively, "constructive geometry"). In another aspect, producing (and/or representing, defining, implementing) DCRs by using geometric primitives may require considerably fewer computational resources compared to producing, for example, the operating envelope 222 of the submarine 200.

In some embodiments, the described system(s), process(es), machine(s), device(s), apparatus(es), method(s), and/or module(s) may calculate an operating point and check (or confirm) whether the operating point falls within a geometric primitive and/or a DCR produced (and/or represented, defined, implemented) using one or more geometric primitives. For example, assume a DCR uses geometric primitives that are an ellipse(s) and a rectangle(s). In such a case, to check whether the operating point falls within the DCR, the ellipse, and/or the rectangle, the described system(s), process(es), machine(s), device(s), apparatus(es), method(s), and/or module(s) may perform the following calculations, steps, stages, and/or blocks (collectively may be referred to as "stages"): a start, a translate, a rotate, a scale, and a check stage.

In some embodiments, at the start (or starting) stage, the operating point may be represented as: [type, center ($c_x$, $c_y$), rotation [cos(h),sin(h)], scale ($s_x$, $s_y$)]. In such a representation(s), x may denote the x-coordinate of the operating point, y may denote the y-coordinate of the operating point, $c_x$ may denote the x-coordinate of the center of the geometric primitive (e.g., circle, rectangle, or other types of shapes), $c_y$ may denote the y-coordinate of the center of the geometric primitive, $s_x$ may denote a scaling in the x direction of the geometric primitive, and $s_y$ may denote a scaling in the y direction of the geometric primitive.

In some embodiments, at the translate (or translation) stage, the described system(s), process(es), machine(s), device(s), apparatus(es), method(s), and/or module(s) may perform the following operation(s): (x, y)=($c_x$–x, $c_y$–y).

In some embodiments, at the rotate (or rotation) stage, the described system(s), process(es), machine(s), device(s), apparatus(es), method(s), and/or module(s) may perform the following operation(s): (x, y)=[x·cos(h)–y·sin(y), x·sin(h)+y·cos(h)].

In some embodiments, at the scale (or scaling) stage, the described system(s), process(es), machine(s), device(s), apparatus(es), method(s), and/or module(s) may perform the following operation(s): (x, y)=[x/$s_x$, y/$s_y$].

In some embodiments, at the check (or checking, confirming) stage, the described system(s), process(es), machine(s), device(s), apparatus(es), method(s), and/or module(s) may perform the following operation(s):

$x^2+y^2<1$, for the ellipse(s); and

|x|<1 AND |y|<1, for the rectangle(s).

Continuing with FIG. 3A, the S-plane 300-1 includes a P axis 302-1 (P 302-1) and a Q axis 304-1 (Q 304-1). In some embodiments, a VA rating (or a VA constraint) of the genset may be produced (and/or represented, defined, implemented) with a first semicircle constraint 306-1 (semicircle 306-1) that is illustrated in FIG. 3A with a half-dash line. Note that the semicircle 306-1 is an example geometric primitive. The semicircle 3061 may be centered at an origin (P=0, Q=0) of the S-plane 300-1, and the semicircle 3061 may have a radius of 1.00 per unit (pu). The radius of the semicircle 306-1 may scale with voltage. Therefore, the semicircle 306-1 may produce a dynamic VA constraint.

In some embodiments, a DCR of a distributed energy resource (DER), for example, a generator, a synchronous generator, an inverter-based resource (IBR), and/or other DERs, may have multiple curves (e.g., CC(s), DCR(s)) that may represent the short term (or transient) and the long term (or steady state) capabilities. For example, a generator rotor heating constraint (e.g., semicircles 308-1, 308-2, and 308-3 in FIGS. 3A, 3B, and 3C, respectively) may have a larger curve (e.g., CC(s), DCR(s)) in the short term, for example, during the first twenty (20) seconds. In the long term, however, the generator's rotor heating constraint may contract with time (e.g., after twenty (20) seconds).

In some embodiments, the DCR boundary conditions may scale due to measurements (e.g., process measurements, one or more variables) in real time, near real time, in time intervals, or a combination thereof. For example, a generator's PQ curve (e.g., constraint, CC, DCR) may scale with voltage, temperature, health of a cooling system, and/or other factors. As another example, turbine/engine curves (e.g., constraint(s), CC(s), DCR(s)) may derate as a function of fuel (e.g., compressed natural gas (CNG), diesel), engine altitude (e.g., at sea level, at 100, 500, 1000, etc. meters above sea level), exhaust temperature, and/or other factors. As another example, point common coupling (PCC) ratings (e.g., constraints, CC(s), DCR(s)) may change as a function of a system's impedance or operator dispatch setpoints. As another example, inverter ratings (e.g., constraint(s), CC(s), DCR(s)) may be modified as a function of ambient temperature, health of a cooling system, an on-board temperature, and/or other factors. As yet another example, a BESS current CC (e.g., measured in Amperes) may be represented as an $I_d/I_q$ ratio (e.g., Park Transformation) and may be limited by, dependent on, and/or based on the BESS's health, a current breaker status, a fuse status, a state of charge, and/or other factors of the BESS.

In some embodiments, a rotor heating constraint of the genset may be produced (and/or represented, defined, implemented) with a second semicircle 308-1 (semicircle 308-1) that is illustrated in FIG. 3A with a dash-dot line. Note that the semicircle 308-1 is another example geometric primitive. The semicircle 308-1 may be centered below the origin of the S-plane 300-1, and the semicircle 308-1 may have a radius of, for example, 1.15 pu. The radius of the semicircle 308-1 may scale with a temperature of the rotor of the genset. Therefore, the semicircle 308-1 may produce a dynamic rotor heating constraint.

In some embodiments, a voltage stability constraint of the genset may be produced (and/or represented, defined, implemented) with a third semicircle 310-1 (semicircle 310-1) that is illustrated in FIG. 3A with a solid line. Note that the semicircle 310-1 is another example geometric primitive. The semicircle 310-1 may be centered below the origin of the S-plane 300-1 (e.g., on a negative side of the Q 304-1), and the semicircle 310-1 may have a radius of, for example, 0.20 pu. An area inside of the semicircle 310-1 may be referred to as a voltage stability exclusion area. The radius of the semicircle 310-1 may scale with voltage. Therefore, the semicircle 310-1 may produce a dynamic voltage stability constraint.

The geometric primitives may be adjusted by moving, rotating, resizing, mirroring, flipping, realigning, and/or so forth one, more than one, and/or all of the geometric primitives to compensate for changes in constraints in a dynamic manner. Then, the geometric primitives may be combined logically, mathematically, spatially, and/or visually by performing unions, intersections, and/or compliments (e.g., relative compliments, absolute compliments, exclusions) to produce (and/or represent, define, implement) an overall, complex, and/or constructive geometry (e.g., a constructive DCR). Although the description partly focuses on representing, defining, and/or implementing a DCR(s), the techniques described herein can easily be applied to representing, defining, and/or implementing an SCR. Note that a DCR and/or an SCR may be collectively referred to as a "capability region."

In more detail, the described DCRs (e.g., the DCRs illustrated in of FIGS. 3A, 3B, 3C, 4, 5A, 5B, 5C) may be produced (and/or represented, defined, implemented) using Boolean operations (and/or algebraic operations) of two or more geometric primitives. For example, an intersection of two or more geometric primitives may be produced using a Boolean AND operation. As another example, a union of two or more geometric primitives may be produced using a Boolean OR operation. As yet another example, an exclusion of one or more geometric primitives may be produced using a Boolean AND NOT operation. The Boolean operations of two or more geometric primitives may be utilized to produce capability regions (e.g., DCRs) with complex shapes.

Further, in aspects, combinations of the geometric primitives (e.g., the geometric primitives illustrated in FIGS. 3A, 3B, 3C, 4, 5A, 5B, and 5C) can be applied as logical sum of product(s) (SoP), a minimum term of product of sum(s) (PoS), a maximum term of canonical representation(s), and/or so forth. Note that in mathematics, computer science, electrical engineering, and/or other fields of study a canonical, normal, or standard form of a mathematical object (e.g., a geometric primitive) may be a way of describing the mathematical object as a mathematical expression (e.g., an equation, a system of linear equations, a matrix, and/or so forth).

Continuing with FIG. 3A, to construct the DCR 320-1 of the genset inside the S-plane 300-1, a first Boolean operation (Boolean 1) using the semicircle 306-1, the semicircle 308-1, and the semicircle 310-1 may produce a first constructive geometry area (first constructive geometry).

(DCR 320-1)=(semicircle 306-1)∩(semicircle 308-1)∩ (¬semicircle 310-1)

Boolean 1

For clarity, in Boolean 1:
the DCR 320-1 of the genset includes an area inside the first constructive geometry that is illustrated in FIG. 3A using small triangles;
the semicircle 306-1 produces the VA rating (or the VA constraint) of the genset;
the semicircle 308-1 produces the rotor heating constraint of the genset;
a ¬semicircle 310-1 denotes an exclusion of an area inside the semicircle 310-1, and the area inside the semicircle 310-1 produces the voltage stability exclusion area of the genset; and
∩ denotes the Boolean AND operation.

In one aspect, using Boolean operations and/or Boolean descriptive terms, the first constructive geometry and/or the DCR 320-1 of the genset can be produced (and/or represented, defined, and/or implemented as): (the semicircle 306-1) AND (the semicircle 308-1) AND (NOT the semicircle 310-1). In another aspect, the first constructive geometry and/or the DCR 320-1 of the genset can be produced as: the intersection of the semicircle 306-1 and the semicircle 308-1, with the semicircle 310-1 excluded.

As forementioned, one, more than one, or all of the constraints (e.g., the semicircle 306-1, the semicircle 308-1, and the semicircle 310-1) can produce dynamic constraints that may be scaled, moved, rotated, resized, mirrored, flipped, realigned, skewed, and/or so forth, for example, inside the S-plane 300-1. Consequently, a capability region (e.g., DCR 320-1) of the genset may be dynamic. Furthermore, the DCR 320-1 includes concave and convex polygons and/or other concave and convex shapes, for example, at a boundary point 322-1. By contrast, using conventional methods may be difficult to include inflexion points to produce a capability region (e.g., the operating envelope 222 of FIG. 2). Next, the description partly focuses on additional constraints of the genset.

FIG. 3B illustrates a dynamic capability region 320-2 (DCR 320-2) of a genset. The DCR 320-2 is inside an S-plane 3002 and is produced (and/or represented, defined, implemented) using geometric primitives, according to one embodiment. FIG. 3B builds on the description of FIG. 3A.
Specifically, an illustration(s) and/or a description of:
the S-plane 300-2 of FIG. 3B is the same as, similar to, and/or equivalent to the S-plane 300-1 of FIG. 3A;
a P axis 302-2 (P 302-2) of FIG. 3B is the same as, similar to, and/or equivalent to the P axis 302-1 (P 302-1) of FIG. 3A;
a Q axis 304-2 (Q 304-2) of FIG. 3B is the same as, similar to, and/or equivalent to the Q axis 304-2 (Q 304-2) of FIG. 3A;
a first semicircle 306-2 of FIG. 3B (semicircle 306-2) is the same as, similar to, and/or equivalent to the semicircle 306-1 of FIG. 3A;

a second semicircle 308-2 of FIG. 3B (semicircle 308-2) is the same as, similar to, and/or equivalent to the semicircle 308-1 of FIG. 3A; and a third semicircle 310-2 of FIG. 3B (semicircle 310-2) is the same as, similar to, and/or equivalent to the semicircle 310-1 of FIG. 3A.

The genset described regarding FIG. 3B may also include a prime mover constraint of the genset. The prime mover may be any type or sub-type of a prime mover, such as a thermal prime mover, a hydraulic primes mover, a reciprocating engine, a turbine engine (e.g., a gas turbine engine), and so forth. In one embodiment, the prime mover constraint may be produced (and/or represented, defined, implemented) with a rectangle 3122 that is illustrated in FIG. 3B with a dash line (see FIG. 3B legend). Note that the rectangle 312-2 is an example geometric primitive. Regarding a vertical position in the FIG. 3B, the rectangle 312-2 may be centered regarding the P 302-2, and the rectangle 312-2 may have a value of, for example, 0.80, 0.85, 0.90, 0.95, 1.0 pu, and so forth.

Continuing with FIG. 3B, to produce the DCR 320-2 of the genset inside the S-plane 300-2, a second Boolean operation (Boolean 2) may produce a second constructive geometry by using the semicircle 306-2, the semicircle 308-2, the semicircle 310-2, and the rectangle 312-2.

$$(DCR\ 320\text{-}2) =$$
$$= (\text{semicircle } 306\text{-}2) \cap (\text{semicircle } 308\text{-}2) \cap$$
$$(\neg \text{semicircle } 310\text{-}2) \cap (\text{rectangle } 312\text{-}2)$$

Boolean 2

For clarity, in Boolean 2:

the DCR 320-2 of the genset includes an area inside the second constructive geometry that is illustrated in FIG. 3B using small triangles;

the semicircle 306-2 produces the VA rating (or the VA constraint) of the genset;

the semicircle 308-2 produces the rotor heating constraint of the genset;

a ¬semicircle 310-2 denotes an exclusion of an area inside the semicircle 310-2, and the area inside the semicircle 310-2 produces (and/or represents, defines, implements) the voltage stability exclusion area of the genset;

the rectangle 312-2 produces the prime mover constraint; and

∩ denotes the Boolean AND operation.

In one aspect, using Boolean operations and/or Boolean descriptive terms, the second constructive geometry and/or the DCR 320-2 of the genset can be produced (and/or represented, defined, implemented) as: (the semicircle 306-2) AND (the semicircle 308-2) AND (NOT the semicircle 310-2) AND (the rectangle 312-2). In another aspect, the second constructive geometry and/or the DCR 320-2 of the genset can be produced as: the intersection of the semicircle 306-2, the semicircle 308-2, and the rectangle 312-2, with the semicircle 310-2 excluded. Next, the description partly focuses on additional, fewer, and/or other constraints of the genset.

FIG. 3C illustrates a dynamic capability region 320-3 (DCR 320-3) of a genset. The DCR 320-3 is inside an S-plane 300-3 and is produced (and/or represented, defined, implemented) using geometric primitives, according to one embodiment. FIG. 3C builds on the descriptions of FIGS. 3A and/or 3B.

Specifically, an illustration(s) and/or a description of:

the S-plane 300-3 of FIG. 3C is the same as, similar to, and/or equivalent to the S-plane 300-1 of FIG. 3A and/or the S-plane 300-2 of FIG. 3B;

a P axis 302-3 (P 302) of FIG. 3C is the same as, similar to, and/or equivalent to the P 302-1 of FIG. 3A and/or the P 302-2 of FIG. 3B;

a Q axis 304-3 (Q 304) of FIG. 3C is the same as, similar to, and/or equivalent to the Q 304-1 of FIG. 3A and/or the Q 304-2 of FIG. 3B;

a first semicircle 306-3 of FIG. 3C (semicircle 306-3) is the same as, similar to, and/or equivalent to the semicircle 306-1 of FIG. 3A and/or the semicircle 306-2 of FIG. 3B;

a second semicircle 308-3 of FIG. 3C (semicircle 308-3) is the same as, similar to, and/or equivalent to the semicircle 308-1 of FIG. 3A and/or the semicircle 308-2 of FIG. 3B; and a first rectangle 312-3 of FIG. 3C (rectangle 312-3) is the same as, similar to, and/or equivalent to the rectangle 312-2 of FIG. 3B.

Further, FIG. 3C produces a stability and an under-excitation(s) constraint(s) of the genset using a first rhombus 314-3 (rhombus 314-3), a second rhombus 316-3 (rhombus 316-3), and a second rectangle 318-3 (rectangle 3183). Note that the rhombus 314-3, the rhombus 316-3, and the rectangle 318-3 are example geometric primitives. Further, the rhombus 314-3 may have a different or the same size than the rhombus 316-3.

In one aspect, the stability and an under-excitation(s) constraint(s) of the genset of FIG. 3C may be more limiting than a voltage stability constraint (e.g., semicircle 310-1 of FIG. 3A and/or semicircle 310-2 of FIG. 3B). In another aspect, in the description regarding the genset of FIG. 3C, the voltage stability constraint (not illustrated in FIG. 3C) may be a constraint with a reduced weight and/or may be a redundant constraint.

In aspects, the differences between the DCR 302-3 of FIG. 3B and the DCR 3203 of FIG. 3C may also be due, or driven by, specifications of a genset, where the specifications may be specific to, or defined by, a genset manufacturer. For example, a first genset manufacturer may define an under-excitation region of the genset with a semicircular exclusion (e.g., the semicircle 310-2 of FIG. 3B). As another example, a second genset manufacturer may define the under-excitation region of the genset with one or more rhomboid exclusions (e.g., the rhombuses 314-3 and 316-3 of FIG. 3C). It is to be understood that similar manufacturer differences may also be applied to other DERs.

Continuing with FIG. 3C, to produce the DCR 320-3 of the genset inside the S-plane 300-3, a third Boolean operation (Boolean 3) may produce a third constructive geometry by using the semicircle 306-3, the semicircle 308-3, the rectangle 312-3, the rhombus 314-3, the rhombus 316-3, and the rectangle 318-3.

$$(DCR\ 320\text{-}3) =$$

$$= (\text{semicircle } 306\text{-}3) \cap (\text{semicircle } 308\text{-}3) \cap$$

$$(\text{rectangle } 312\text{-}3) \cap (\neg \text{ rhombus } 314\text{-}3) \cap$$

$$\cap (\neg \text{ rhombus } 316\text{-}3) \cap (\neg \text{ rectangle } 318\text{-}3)$$

Boolean 3

For clarity, in Boolean 3:
the DCR 320-3 of the genset includes an area inside the third constructive geometry that is illustrated in FIG. 3C using small triangles;
the semicircle 306-3 produces the VA rating (or the VA constraint) of the genset;
the semicircle 308-3 produces the rotor heating constraint of the genset;
the rectangle 312-3 produces the prime mover constraint;
a ¬rhombus 314-3 denotes an exclusion of an area inside the rhombus 314-3, and the area inside the rhombus 314-3 produces a first portion of the stability and the under-excitation(s) constraint(s) of the genset;
a ¬rhombus 316-3 denotes an exclusion of an area inside the rhombus 316-3, and the area inside the rhombus 316-3 produces a second portion of the stability and the under-excitation(s) constraint(s) of the genset;
a ¬rectangle 318-3 denotes an exclusion of an area inside the rectangle 318-3, and the area inside the rectangle 318-3 produces a third portion of the stability and the under-excitation(s) constraint(s) of the genset; and
∩ denotes the Boolean AND operation.

In one aspect, using Boolean operations and/or Boolean descriptive terms, the third constructive geometry and/or the DCR 320-3 of the genset can be produced (and/or represented, defined, implemented) as: (the semicircle 306-3) AND (the semicircle 308-3) AND (the rectangle 312-3) AND (NOT the rhombus 314-3) AND (NOT the rhombus 316-3) AND (NOT the rectangle 318-3). In another aspect, the third constructive geometry and/or the DCR 320-3 of the genset can be produced as: the intersection of the semicircle 306-3, the semicircle 308-3, and the rectangle 312-3, with the rhombus 314-3, the rhombus 316-3, and the rectangle 318-3 excluded. Next, the description partly focuses on producing a DCR of a battery energy storage system (BESS), for example, an uninterruptible power supply (UPS).

Figure 4:
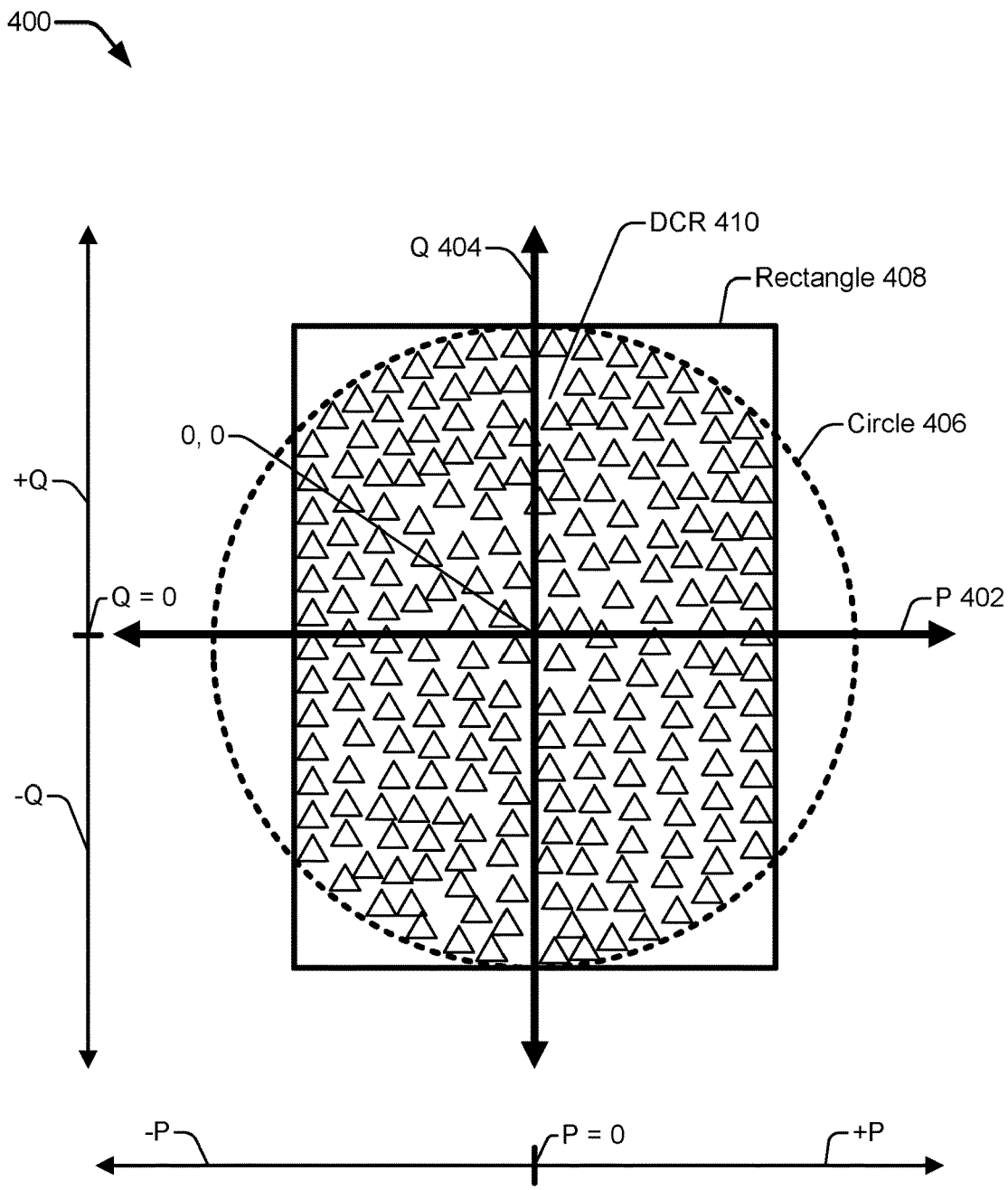
FIG. 4 illustrates a DCR of a battery energy storage system (BESS); the DCR is inside an S-plane, and the DCR is produced using geometric primitives, according to one embodiment.

FIG. 4 illustrates a dynamic capability region 410 (DCR 410) of a BESS. According to one embodiment, the DCR 410 is inside a complex electrical power plane 400 (S-plane 400). The S-plane 400 includes a P axis 402 (P 402) and a Q axis 404 (Q 404).

In some embodiments, regarding a BESS, a positive P may indicate that the BESS is discharging real power, and the positive P may lie on a right-hand direction of an S-plane (e.g., S-plane 400). A negative P may indicate that the BESS is receiving real power, for example, from a macrogrid (e.g., a utility power grid), a microgrid, a generator, and/or so forth. The negative P may lie on a left-hand direction of the S-plane, for example, as is illustrated in FIG. 4. A positive Q may indicate that the BESS is discharging reactive power, for example, an electrical power that is generally consumed by inductive loads or produced by capacitive loads. The positive Q may lie on an "up" direction of the S-plane, for example, as is illustrated in FIG. 4. Lastly, a negative Q may indicate that the generator is consuming reactive power, and the negative Q may lie on a "down" direction of the S-plane, for example, as is illustrated in FIG. 4.

In some embodiments, a VA rating (or a VA constraint) of inverter electronics of the BESS may be produced (and/or represented, defined, implemented) with a circle 406 that is illustrated in FIG. 4 with a half-dash line (see FIG. 4 legend). Note that the circle 406 is an example geometric primitive. The radius of the circle 406 can and/or may be scaled depending on several factors, such as a temperature, a quality state of the inverter electronics, and/or so forth. For example, with increased utilization (e.g., aging, degrading) of the BESS, the VA rating of the BESS may decrease. As another example, the BESS may have a poorer performance in considerably cold weathers compared to milder weathers. Therefore, the circle 406 can produce a dynamic VA rating constraint.

In addition to the VA rating constraint, the BESS may include a charging or discharging constraint. For example, the charging or discharging constraint of the BESS may be associated with a direct current (DC) to another DC (DC-to-DC) converter. In one embodiment, the charging or discharging constraint of the BESS may be produced with a rectangle 408. Note that the rectangle 408 is an example geometric primitive. As is illustrated in FIG. 4, the charging or discharging constraint (e.g., the rectangle 408) may produce a more limited constraint than the VA rating constraint (e.g., the circle 406). Further, the charging or discharging constraint may also be scaled based on several factors, such as a temperature, a quality state of components of the DC-to-DC converter, and/or so forth. Therefore, the rectangle 408 may produce a dynamic charging or discharging constraint.

In FIG. 4, to produce the DCR 410 of the BESS, a fourth Boolean operation (Boolean 4) using the circle 406 and the rectangle 408 can produce (and/or represent, define, implement) a fourth constructive geometry area (fourth constructive geometry).

$$(DCR\ 410) = (\text{circle } 406) \cap (\text{rectangle } 408)$$

Boolean 4

For clarity, in Boolean 4:
the DCR 410 of the BESS includes an area inside the fourth constructive geometry that is illustrated in FIG. 4 using small triangles;
the circle 406 produces (and/or represents, defines, implements) the VA rating (or the VA constraint) of the BESS;
the rectangle 408 produces the charging or discharging constraint of the BESS; and
∩ denotes the Boolean AND operation.

In one aspect, using Boolean operations and/or Boolean descriptive terms, the fourth constructive geometry and/or the DCR 410 of the BESS can be produced (and/or represented, defined, implemented) as: (the circle 406) AND (the rectangle 408). In another aspect, the fourth constructive geometry and/or the DCR 410 of the BESS can be produced as: the intersection of the circle 406 and the rectangle 408. Next, the description partly focuses on producing a DCR of a microgrid point of common coupling (PCC).

Figure 5A:
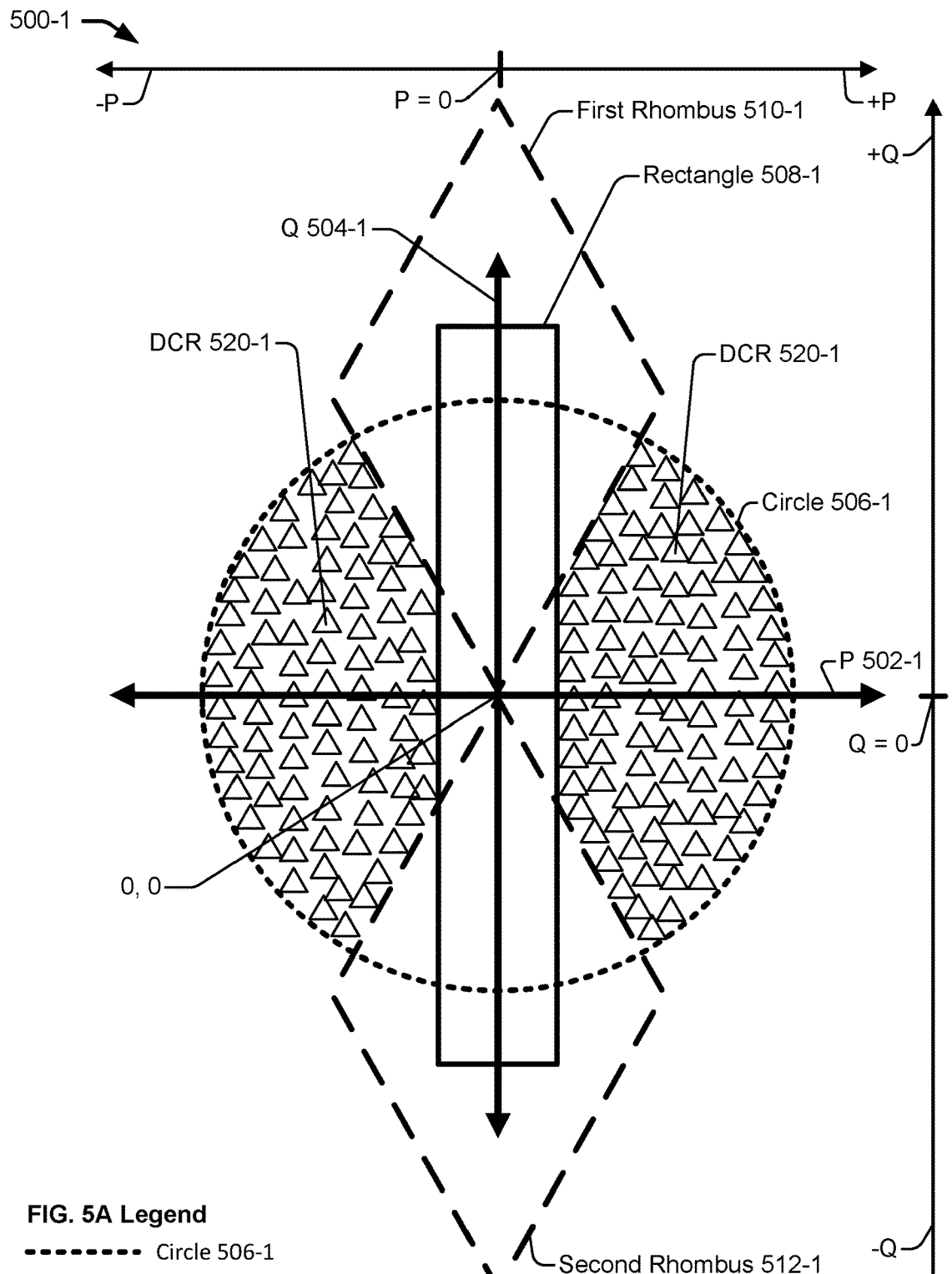
FIG. 5A illustrates a DCR of a microgrid point common coupling (PCC); the DCR is inside an S-plane, and the DCR is produced using geometric primitives, according to one embodiment.

FIG. 5A illustrates a dynamic capability region 520-1 (DCR 520-1) of a microgrid PCC. According to one embodiment, the DCR 520-1 is inside an S-plane 500-1, and the S-plane 500-1 includes a P axis 502-1 (P 502-1) and a Q axis 504-1 (Q 504-1).

In some embodiments, the microgrid may be a decentralized group of electrical generation devices (e.g., the genset(s) of FIGS. 3A, 3B, and 3C), electrical storage devices (e.g., the BESS of FIG. 4), and/or electrical loads. The microgrid may be coupled (or connected) to and/or may operate synchronously with a macrogrid (e.g., a utility-owned, a utility-regulated, and/or a utility-operated power grid). Further, the microgrid may be decoupled (or disconnected) from the macrogrid, and the microgrid may operate autonomously in an "island mode." In some embodiments, the microgrid may operate in the island mode based on technical conditions (e.g., emergency(ies), blackout(s), brownout(s)), economic conditions (e.g., high marketplace electric energy rates), may permanently operate "off the grid" (e.g., disconnected from the macrogrid), and/or so forth.

In some embodiments, a maximum current magnitude (or a maximum current constraint), for example, a maximum $I_L$ and/or a maximum $I_{Ln}$, may be produced (and/or represented, defined, implemented) with a circle 506-1 that is illustrated in FIG. 5 with a half-dash line (see FIG. 5 legend). Note that the circle 506-1 is an example geometric primitive. Further, the current constraint (e.g., the circle 506-1) may be scaled based on a voltage magnitude (e.g., $V_{LL}$ magnitude and/or $V_{Ln}$ magnitude) and/or a line (or a busbar) temperature. Therefore, the circle 506 can produce a dynamic current constraint.

In some embodiments, the microgrid PCC may also include a deadband constraint. In FIG. 5A, the deadband constraint is produced using a rectangle 508-1 (see FIG. 5A legend). Note that the rectangle 508-1 is an example geometric primitive. In aspects, the deadband constraint (e.g., the rectangle 508-1) may produce a required (or a sufficient) amount of real power (P) that the microgrid requires to ensure a sufficient flow of the P that may be required to perform a frequency-based islanding detection.

In some embodiments, the microgrid PCC may also include a minimum power factor (p.f.) constraint. The minimum p.f. constraint is produced using a first rhombus 510-1 (rhombus 510-1) and a second rhombus 5121 (rhombus 512-1), as is illustrated in FIG. 5A. Note that the rhombus 510-1 and rhombus 512-1 are example geometric primitives. In aspects, the minimum p.f. constraint may be driven by a requirement (e.g., a contractual requirement) between operators and/or owners of the microgrid and operators and/or owners of the macrogrid (e.g., a utility company). Depending on changes on such requirements, the rhombus 510-1 and the rhombus 512-1 may be scaled. Therefore, the minimum p.f. constraint may be a dynamic constraint.

Continuing with FIG. 5A, to produce the DCR 520-1 of the microgrid PCC inside the S-plane 500-1, a fifth Boolean operation (Boolean 5) may produce a fifth constructive geometry by using the circle 5061, the rectangle 508-1, the rhombus 510-1, and the rhombus 512-1.

$$(DCR\ 520-1) =$$
$$= (\text{circle } 506-1) \cap (\neg \text{rectangle } 508-1) \cap$$
$$(\neg \text{rhombus } 510-1) \cap (\neg \text{rhombus } 512-1)$$

Boolean 5

For clarity, in Boolean 5:
- the DCR 520-1 of the microgrid PCC includes an area(s) inside the fifth constructive geometry(ies) that is/are illustrated in FIG. 5A using small triangles;
- the circle 506-1 produces the maximum current constraint of the microgrid PCC;
- a ¬rectangle 508-1 denotes an exclusion of an area inside the rectangle 508-1, and the rectangle 508-1 produces the deadband constraint of the microgrid PCC;
- a ¬rhombus 510-1 denotes an exclusion of an area inside the rhombus 510-1, and the rhombus 510-1 produces a first portion of the minimum p.f. constraint of the microgrid PCC;
- a ¬rhombus 512-1 denotes an exclusion of an area inside the rhombus 512-1, and the rhombus 512-1 produces a second portion of the minimum p.f. constraint of the microgrid PCC; and
- $\cap$ denotes the Boolean AND operation.

In one aspect, using Boolean operations and/or Boolean descriptive terms, the fifth constructive geometry(ies) and/or the DCR 520-1 of the microgrid PCC can be produced (and/or represented, defined, implemented) as: (the circle 506-1) AND (NOT the rectangle 508-1) AND (NOT the rhombus 510-1) AND (NOT the rhombus 512-1). In another aspect, the fifth constructive geometry(ies) and/or the DCR 520-1 of the microgrid PCC can be produced as: the circle 506, with the rectangle 508-1, the rhombus 510-1, and the rhombus 512-1 excluded. Next, the description partly focuses on representing, defining, and/or implementing another DCR of a microgrid PCC.

Figure 5B:
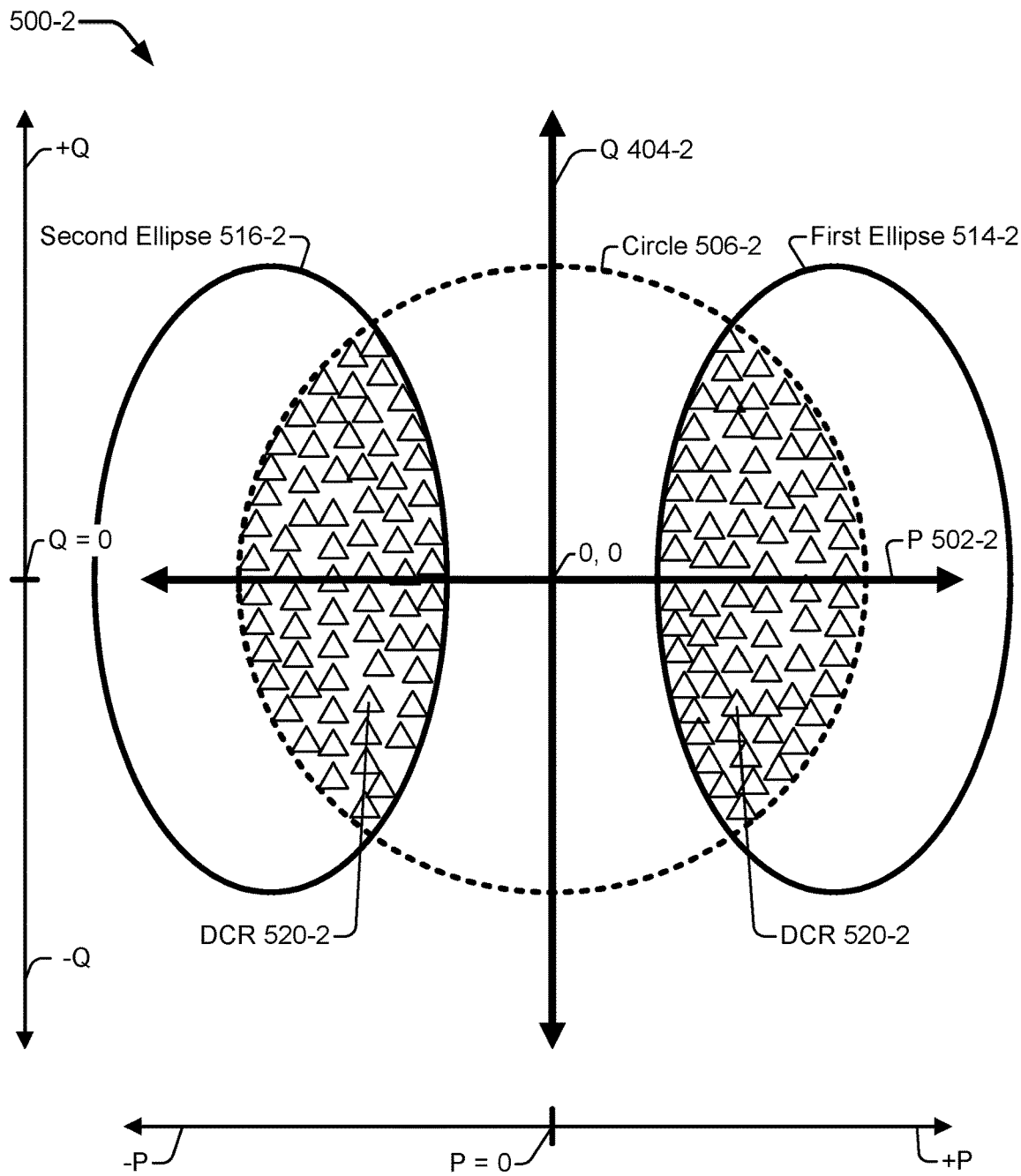
FIG. 5B illustrates another DCR of a microgrid PCC; the DCR is inside an S-plane, and the DCR is produced using geometric primitives, according to one embodiment.

FIG. 5B illustrates a dynamic capability region 520-2 (DCR 520-2) of a microgrid PCC inside an S-plane 500-2. The S-plane 500-2 includes a P axis 502-2 (P 502-2) and a Q axis 504-2 (Q 504-2). FIG. 5B builds on the description of FIG. 5A.

Specifically, an illustration(s) and/or a description(s) of:
- the S-plane 500-2 of FIG. 5B is the same as, similar to, and/or equivalent to the S-plane 500-1 of FIG. 5A;
- the P axis 502-2 (P 502-2) of FIG. 5B is the same as, similar to, and/or equivalent to the P axis 502-1 (P 502-1) of FIG. 5A; and
- the Q axis 504-2 (Q 504-2) of FIG. 5B is the same as, similar to, and/or equivalent to the Q axis 504-1 (Q 504-1) of FIG. 5A.

In some embodiments, the DCR 520-2 does not utilize a maximum current constraint (e.g., the circle 506-1 of FIG. 5A), a deadband constraint (e.g., the rectangle 508-1 of FIG. 5A), and/or a minimum p.f. constraint (e.g., the rhombus 510-1 and the rhombus 512-2 of FIG. 5A). Instead, a capability region inside the S-plane 5002 that may be produced with a first ellipse 514-2 and a second ellipse 516-2 that may partly produce the DCR 520-2 of the microgrid PCC inside the S-plane 500-2. Note that the ellipse 514-2 and the ellipse 5162 that are illustrated with solid lines in FIG. 5B are example geometric primitives.

Nevertheless, in some embodiments, a maximum VA rating (or a maximum VA constraint) of the microgrid PCC may be produced with a circle 506-2 that is illustrated in FIG. 5B with a half-dash line (see legend of FIG. 5B). Note that the circle 506-2 is an example geometric primitive.

Continuing with FIG. 5B, to represent, define, and/or implement the DCR 520-2 of the microgrid PCC inside the S-plane 500-2, a sixth Boolean operation (Boolean 6) may produce a sixth constructive geometry(ies) by using the circle 506-2, the ellipse 514-2, and the ellipse 516-2.

$$(DCR\ 520\text{-}2) = (\text{circle } 506\text{-}2) \cap [(\text{ellipse } 514\text{-}2) \cup (\text{ellipse } 516\text{-}2)]$$

Boolean 6

For clarity, in Boolean 6:
- the DCR 520-2 of the microgrid PCC includes an area(s) inside the sixth constructive geometry(ies) that is/are illustrated in FIG. 5B using small triangles;
- the circle 506-2 produces the maximum VA constraint of the microgrid PCC;
- the ellipse 514-2 produces a first allowed region of the microgrid PCC;
- the ellipse 516-2 produces a second allowed region of the microgrid PCC;
- ∩ denotes the Boolean AND operation; and
- ∪ denotes the Boolean OR operation.

In one aspect, using Boolean operations and/or Boolean descriptive terms, the sixth constructive geometry(ies) and/or the DCR 520-2 of the microgrid PCC can be produced (and/or represented, defined, implemented) as: (the circle 506-2) AND [(the ellipse 514-2) OR (the ellipse 516-2)]. In another aspect, the sixth constructive geometry(ies) and/or the DCR 520-2 of the microgrid PCC can be produced as: unions of a first and a second intersection, where the first intersection is an intersection of the circle 506-2 and the ellipse 514-2, and the second intersection is an intersection of the circle 506-2 and the ellipse 516-2. Next, the description partly focuses on producing another DCR of a microgrid PCC.

Figure 5C:
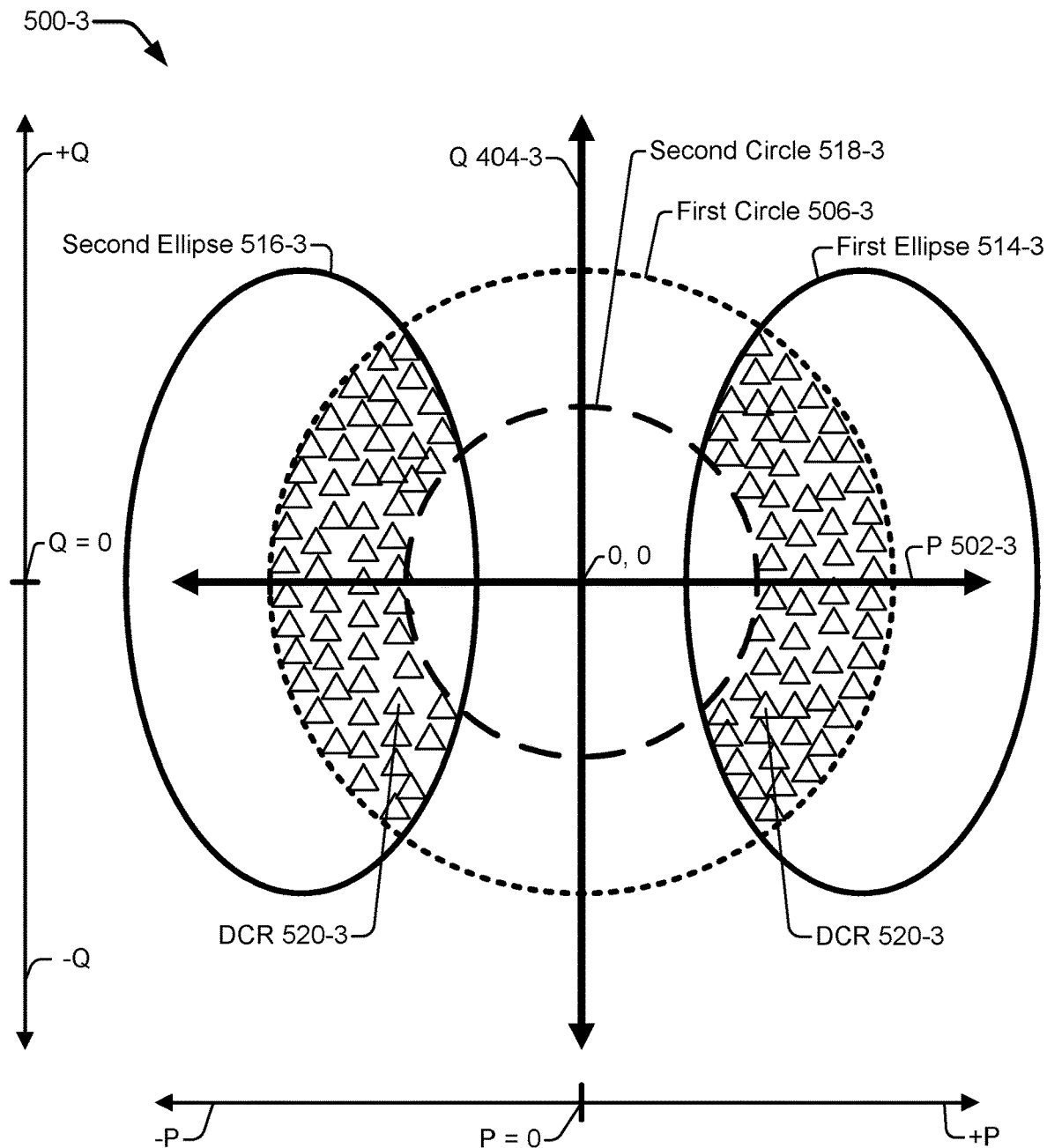
FIG. 5C illustrates another DCR of a microgrid PCC; the DCR is inside an S-plane, and the DCR is produced using geometric primitives, according to one embodiment.

FIG. 5C illustrates a dynamic capability region 520-3 (DCR 520-3) of a microgrid PCC inside an S-plane 500-3. The S-plane 500-3 includes a P axis 502-3 (P 502-3) and a Q axis 504-3 (Q 504-3). FIG. 5C builds on the descriptions of FIG. 5A and/or FIG. 5B.

Specifically, an illustration(s) and/or a description(s) of:
- the S-plane 500-3 of FIG. 5C is the same as, similar to, and/or equivalent to the S-plane 500-1 of FIG. 5A and/or the S-plane 500-2 of FIG. 5B;
- the P axis 502-3 (P 502-3) of FIG. 5C is the same as, similar to, and/or equivalent to the P axis 502-1 (P 502-1) of FIG. 5A and/or the P axis 502-2 (P 502-2) of FIG. 5B;
- the Q axis 504-3 (Q 504-3) of FIG. 5B is the same as, similar to, and/or equivalent to the Q axis 504-1 (Q 504-1) of FIG. 5A and/or the Q axis 504-2 (Q 504-2) of FIG. 5B;
- a first circle 506-3 (circle 506-3) of FIG. 5C is the same as, similar to, and/or equivalent to the circle 506-2 of FIG. 5B;
- a first ellipse 514-3 (ellipse 514-3) of FIG. 5C is the same as, similar to, and/or equivalent to the ellipse 514-2 of FIG. 5B; and
- a second ellipse 516-3 (ellipse 516-3) of FIG. 5C is the same as, similar to, and/or equivalent to the ellipse 516-2 of FIG. 5B.

In some embodiments, the DCR 520-3 also includes a minimum VA constraint. The minimum VA constraint may be produced with a second circle 518-3 (circle 518-3) that is illustrated with a dash line (see FIG. 5C legend). Note that the circle 518-3 is an example geometric primitive that may be scalable. Therefore, the minimum VA constraint may be a dynamic constraint.

Continuing with FIG. 5C, to produce the DCR 520-3 of the microgrid PCC inside the S-plane 500-3, a seventh Boolean operation (Boolean 7) may represent, define, and/or implement a sixth constructive geometry(ies) by using the circle 506-3, the ellipse 514-3, the ellipse 516-3, and the circle 518-3.

$$(\text{DCR } 520\text{-}3) = (\text{circle } 506\text{-}3) \cap [(\text{ellipse } 514\text{-}3) \cup (\text{ellipse } 516\text{-}3)] \cap (\neg \text{circle } 518\text{-}3)$$

Boolean 7

For clarity, in Boolean 7:
- the DCR 520-3 of the microgrid PCC includes an area(s) inside the seventh constructive geometry(ies) that is/are illustrated in FIG. 5C using small triangles;
- the circle 506-3 produces the current constraint of the microgrid PCC;
- the ellipse 514-3 produces a first allowed region of the microgrid PCC;
- the ellipse 516-3 produces a second allowed region of the microgrid PCC;
- a ¬circle 518-3 denotes an exclusion of an area inside the circle 518-3, and the circle 518-3 produces the minimum VA constraint of the microgrid PCC;
- ∩ denotes the Boolean AND operation; and
- ∪ denotes the Boolean OR operation.

In one aspect, using Boolean operations and/or Boolean descriptive terms, the seventh constructive geometry(ies) and/or the DCR 520-3 of the microgrid PCC can be produced (and/or represented, defined, implemented) as: (the circle 506-3) AND [(the ellipse 514-3) OR (the ellipse 516-3)] AND (NOT the circle 506-3). In another aspect, the seventh constructive geometry(ies) and/or the DCR 520-3 of the microgrid PCC can be produced as: unions of a first and a second intersection, where the first intersection is an intersection of the circle 506-3 and the ellipse 514-3, the second intersection is an intersection of the circle 506-3 and the ellipse 516-3, and the unions having the circle 506-3 excluded. Next, the description partly focuses on a DCR environment of an electric power system protection.

Figure 6:
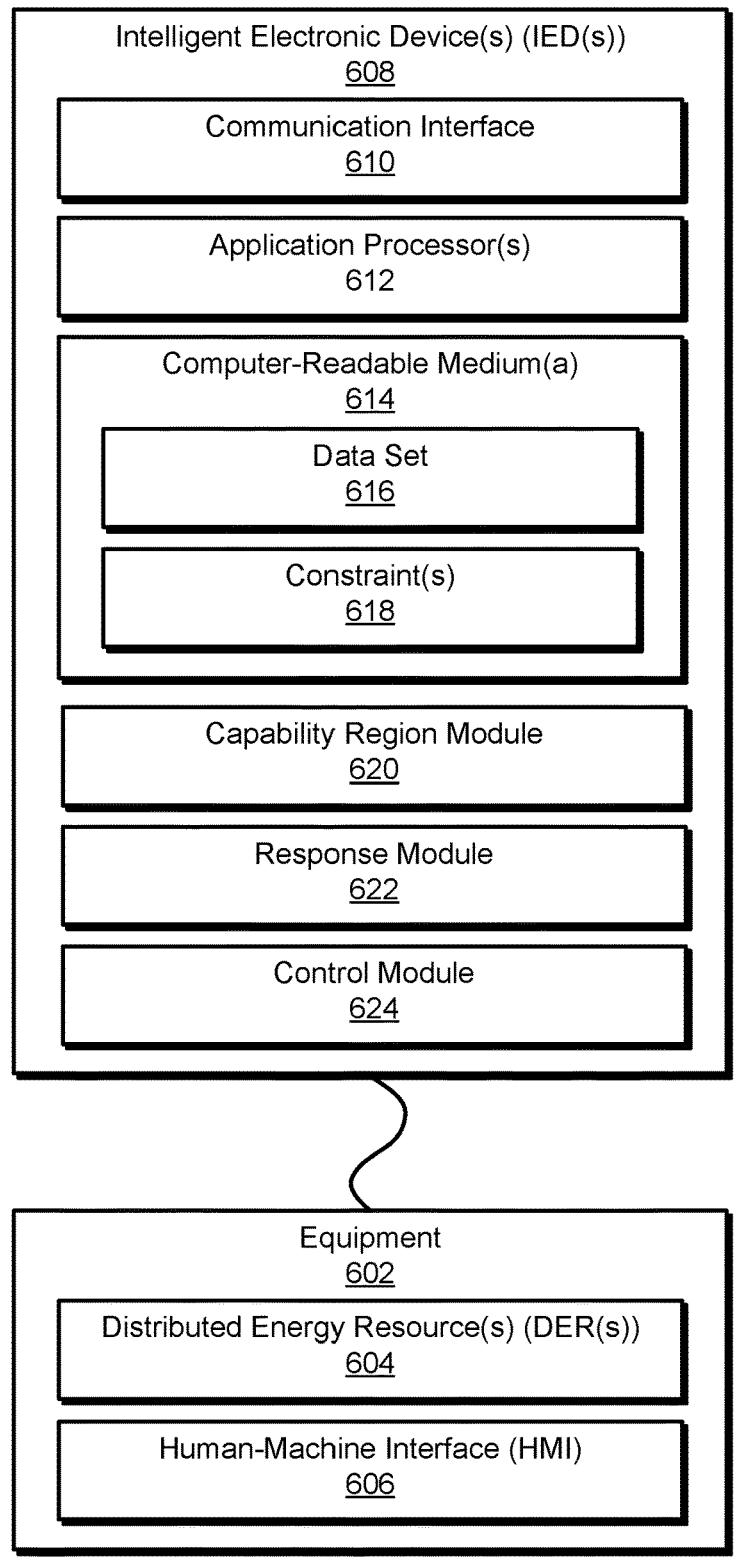
FIG. 6 illustrates a system that can produce a capability region for one or more monitored equipment, according to one embodiment.

FIG. 6 illustrates a system 600 that can produce (and/or represent, define, implement) a capability region of one or more monitored equipment 602 (equipment 602), according to one embodiment. In some embodiments, the equipment 602 may be or may include at least one distributed energy resource 604 (DER 604) that may be capable of transferring, converting producing, consuming, and/or storing real, imaginary, and/or complex power (and apparent power). For clarity, regarding the conversion, the DER 604 may perform a conversion from a first frequency to a second frequency. The DER 604 may also be to convert a first DC power to a second DC power, a second power convertor configured to convert a first alternating current (AC) power to a third DC power, a third power convertor configured to convert a fourth DC power to a second AC power, and/or so forth.

The DER 604 may include one or more of a genset, a BESS, a PCC, an inverter-based resource (IBR), an inter-tie point, a fuel cell, a power frequency converter, a DC-to-DC convertor, an AC-to-DC convertor, a DC-to-AC convertor, an electric vehicle (EV), an electric vehicle charging station (EVSE), a solar unit (e.g., a photovoltaic (PV) unit), a myriad of power loads (e.g., resistive loads, capacitive loads, inductive loads, or and/or a combination thereof), an adjustable frequency drive, and so forth.

The capability region of the equipment 602 and/or the DER 604 may be a DCR (e.g., DCRs 3201, 320-2, 320-3, 410, 5201, 520-2, 5203), an SCR, a CC, a capability area, an operating region, an operating envelope, and/or so forth. Therefore, the capability region may be dynamic or static.

Further, the system 600 may represent, define, and/or implement the capability region of the equipment 602 and/or the DER 604 in a 2D space, a 3D space, and/or in a greater-than-3D space. The capability region may include: a first region, where the equipment 602 and/or the DER 604 may safely operate during a steady-state period (steady-state region); a second region, where the equipment 602 and/or the DER 604 may safely operate for a transient-state period (transient-state region); and/or a third region, indicating an unsafe, a prohibited, and/or an unacceptable operation of the equipment 602 and/or the DER 604 (collectively "an unsafe region").

In one aspect, the system 600 may produce the capability region of the equipment 602 and/or the DER 604 in a P vs. Q domain (e.g., the S-planes 300-1, 300-2, 300-3, 400, 500-1, 500-2, 500-3). For example, the P vs. Q domain may be a 2D space, where a first variable (e.g., the variable P) may be help define a first dimension of the 2D space, and a second variable (e.g., the variable Q) may help define a second dimension of the 2D space. Nevertheless, in the P vs. Q domain, the system 600 may use a variable (e.g., a P, Q, S, |S|, I, V, Z, X, and so forth) of the equipment 602 and/or the DER 604 to produce (and/or implement) a constraint. In another aspect, the system 600 may produce the capability region of the equipment 602 and/or the DER 604 in an $I_d$ vs. $I_q$ domain. The capability model in the $I_d$ vs. $I_q$ domain may, for example, influence an IBR to produce $I_0$, $I_1$, and $I_2$ currents during fault conditions. In yet another aspect, the system 600 may produce a steady-state capability region of the equipment 602 and/or the DER 604 in the P vs. Q domain and a transient-state capability model of the equipment 602 and/or the DER 604 in the $I_d$ vs. $I_q$ domain.

The equipment 602 and/or the DER 604 may also include a human-machine interface 606 (HMI 606) that may aid an operator and/or an engineer of the system 600, the equipment 602, and/or the DER 604 to view in real time, or in time intervals, the capability region of the equipment 602 and/or the DER 604. Therefore, the operator and/or the engineer may view whether the equipment 602 and/or the DER 604 is operating in a steady-state region, a transient-state region, or an unsafe region. For example, assume the equipment 602 and/or the DER 604 is a genset (e.g., gensets of FIG. 3A, 3B, or 3C) that supports various loads, for example, lighting, blowers, pumps, motors, and so forth. As the operator and/or the engineer adds (e.g., turns on, energizes) one or more loads, using the HMI 606, the operator and/or the engineer can view whether the genset can support the added load(s) full time, can support the added load(s) for a limited time (e.g., long enough to turn on a motor or long enough to support an inrush current of the motor), or cannot support the added loads. It is to be appreciated that indicating that the genset can support certain loads for a limited time (e.g., in a transient-state region) may aid an owner (e.g., an institution, an establishment, a municipality, a factory, a business) of the genset and the various loads to refrain from purchasing an oversized or an additional genset.

In addition to, or alternatively of, the HMI 606, the equipment 602 and/or the DER 604 may include indicator lights of one or more colors, such as a red-light indicator (e.g., indicating the unsafe region), a yellow-light indicator (e.g., indicating the transient-region), and/or a green-light indicator (e.g., indicating the steady-state region) that may help the operator and/or the engineer monitor the capability region. In aspects, the HMI 606 and/or the light indicators may be part of an emergency management system (EMS).

In some embodiments, the system 600 includes a protection device or an intelligent electronic device 608 (IED 608) that may monitor, protect, and/or control the equipment 602 and/or the DER 604. To so do, the IED 608 may produce (and/or represent, define, implement) the capability region of the equipment 602 and/or the DER 604. As described herein, the IED 608 may be any processor-based (and/or microprocessor-based) device that monitors, controls, automates, and/or protects monitored equipment (e.g., equipment 602, DER 604) within a system (e.g., the system 600). For example, the IED may be, include, and/or utilize one or more of a distributed energy resource management system (DERMS), a microgrid controller, a real-time automation controller (RTAC), a remote terminal unit, a differential relay, a distance relay, a directional relay, a feeder relay, an overcurrent relay, a voltage regulator control, a voltage relay, a breaker failure relay, a generator relay, a motor relay, a bay controller, a meter, a recloser control, a communication processor, a computing platform, a programmable logic controller (PLC), a programmable logic arrays (PLA), a programmable array logic (PAL), a field-programmable gate array (FPGA), a complex programmable logic device (CPLD), a programmable automation controller, an input and/or an output module, a motor drive, an adjustable frequency drive (AFD), and the like.

In some embodiments, the IED 608 may also support an integrated security, such as a cybersecurity, a restricted user access, an encryption, a user activity log, a sequence of events log, notification(s) of events, a secure shell, a transport layer security, biometric and/or username and password authentication, diagnostics of the system 600, the equipment 602, the DER 604, the IED 608, and/or any other equipment that is not explicitly illustrated in FIG. 6.

The IED 608 may communicate with the equipment 602, the DER 604, the HMI 606, and/or any other device that is not explicitly illustrated in FIG. 6 using a communication interface 610. The communication interface 610 may be a wired and/or a wireless communication interface and enables the IED 608 to communicate with the equipment 602, the DER 604, HMI 606, and/or so forth directly and/or indirectly using any type of communication protocol and/or standard. The communication may be supported by a network that may facilitate communication with other computing devices and/or networks and/or other computing and/or communications networks. The IED 608 may be equipped with any network connectivity, such as, for example, Ethernet (IEEE 1102.3), Token Ring (IEEE 1102.5), Fiber Distributed Datalink Interface (FDDI), or Asynchronous Transfer Mode (ATM). Further, the communication interface 610 may be configured to support a variety of network protocols such as, for example, Internet Protocol (IP), Transfer Control Protocol (TCP), Network File System over UDP/TCP, Server Message Block (SMB), Microsoft® Common Internet File System (CIFS), Hypertext Transfer Protocols (HTTP), Direct Access File System (DAFS), File Transfer Protocol (FTP), Real-Time Publish Subscribe (RTPS), Open Systems Interconnection (OSI) protocols, Simple Mail Transfer Protocol (SMTP), Secure Shell (SSH), Secure Socket Layer (SSL), and/or so forth.

In some embodiments, the IED 608 may include and/or may utilize at least one application processor 612 (processor 612) and at least one computer-readable medium 614. The processor 612 may include any type of processor, such as a central processing unit (CPU), a multi-core processor, and/or so forth. Regardless of the type, technology, complexity, process node, generation, and so forth, the processor 612 can execute instructions and/or configurations (e.g., code, pseudocode, algorithms, application software) that may be stored in, or accessed by, the computer-readable medium

614. The computer-readable medium 614 may include any suitable data storage media, for example, non-volatile memory (e.g., flash memory), volatile memory (e.g., random-access memory (RAM)), optical media, magnetic media (e.g., disc or tape), a combination thereof, and/or so forth. Moreover, the computer-readable medium 614 does not include transitory propagating signals or carrier waves.

In some embodiments, the computer-readable medium 614 can store and/or access (e.g., from the equipment 602, the DER 604) a data set 616. The data set 616 may include a plurality of known performance characteristics of the equipment 602 and/or the DER 604. The performance characteristics of the equipment 602 and/or DER 604 may be based on a plurality of variables that include, for example, T, i (t), I, sub-transient fault currents, $I_0$, $I_1$, $I_2$, $I_L$, $I_n$, v(t), V, $V_{LL}$, $V_{Ln}$, $I_d$, $I_q$, R, L, C, X, Z, G, q, f, P, Q, S, |S|, p.f, t, a turbine-governor regulation constant, an electrical torque, a mechanical torque, a net accelerating torque, a permittivity, Γ, a magnetic flux, a magnetic flux linkage, and/or so forth. The computer-readable medium 614 may also store and/or access a constraint library 618 (constraints 618). The constraints 618 include a plurality of geometric primitives. In some embodiments, each geometric primitive of the plurality of geometric primitives (and/or the constraints 618) is based on one or more variables of the plurality of variables. As forementioned, each geometric primitive of the plurality of geometric primitive may be adjusted based on a value of one or more variables of the plurality of variables.

To do so, the protection device 608 and/or the IED may also include and/or utilize a capability region module 620. In some embodiments, using the processor 612 and/or the computer-readable medium 614, the capability region module 620 may be configured to analyze the data set 616. Based on the data set 616, the capability region module 620 may use one or more geometric primitives of the plurality of the geometric primitives to produce a capability region of the equipment 602 and/or the DER 604. Then, the capability region module 620 may be configured to combine logically, mathematically, spatially, and/or visually at least two geometric primitives to perform unions, intersections, and/or exclusions to produce an overall constructive geometry that produces the capability region (e.g., the DCRs 320-1, 320-2, 320-3, 410, 520-1, 520-2, 520-3). For example, the capability region module 620 may perform the unions, intersections, and/or exclusions by perform Boolean operations (e.g., Booleans 1, 2, 3, 4, 5, 6, and/or 7) by using at least two geometric primitives. As another example, the capability region module 620 may adjust each geometric primitive by, for example, utilizing matrix transformation(s). In aspects, the adjustments of the geometric primitives may include scaling, moving, rotating, resizing, mirroring, flipping, realigning, skewing, shearing, stretching, squeezing, reflecting, orthogonally projecting, perceptively projecting, a combination thereof, and/or so forth of each geometric primitive. It is to be understood that each geometric primitive of the plurality of geometric primitives may be adjusted separately and/or independently, for example, based on value changes of a particular variable.

The IED 608 may also include and/or utilize a response module 622. In some embodiments, the response module 622 may be configured to determine an operating point of the equipment 602 and/or the DER 604 by using the plurality of variables. Further, the response module 622 may be configured to compare the operating point with the capability region of the equipment 602 and/or the DER 604. For example, the operating point may be overlayed on the capability region, and the operating point and the capability region may be displayed on the HMI 606. The HMI 606 may also be or include a touchscreen that may enable the operator and/or the engineer of the system 600, the equipment 602, and/or the DER 604 to view the operating point and the capability region and/or take a control action.

To do so, the IED 608 may also include and/or utilize a control module 624. In some embodiments, the control module 624 may be configured to implement a control action based on a comparison of the operating point of the equipment 602 and/or the DER 604 and the capability region of the equipment 602 and/or the DER 604. The control action may include energize or deenergize one, more than one, or equipment (e.g., equipment 602, DER 604) that are coupled to the system 600.

Although the capability region module 620, the response module 622, and the control module 624 are illustrated in FIG. 6 as being part of the protection device 608 (and/or the IED), these modules may belong to different apparatuses. For example, the capability region module 620 may be produced on a first apparatus (e.g., on the equipment 602), the response module 622 may determine the operating point and compare the operation point with the capability region on a second apparatus (e.g., on the DER 604), and the control module 624 may perform a control action on a third apparatus (e.g., on the HMI 606, an alarm apparatus with indicator lights, a circuit breaker, a relay, and so forth). Next, the description partly focuses on a method (or a process workflow) for producing and/or utilizing a DCR of one or more than one equipment.

Figure 7:
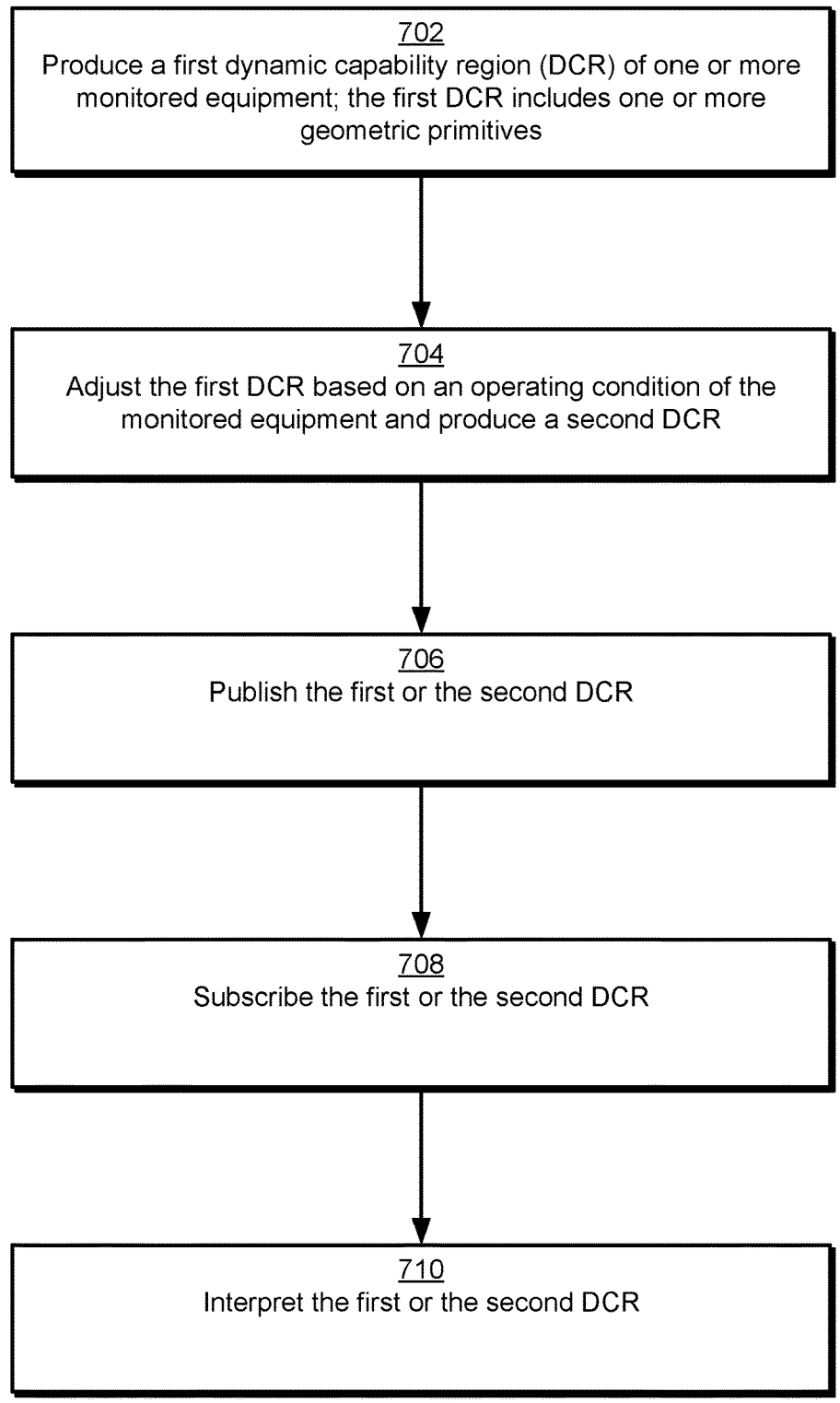
FIG. 7 illustrates a DCR process workflow, according to one embodiment.

FIG. 7 illustrates a method 700 for producing and/or utilizing a DCR of one or more equipment. FIG. 7 is partly described in the context of FIGS. 3A, 3B, 3C, 4, 5A, 5B, 5C, and 6. In addition, the steps, the stages, and/or the blocks of the method 700 do not necessarily need to be executed in any specific order, or even sequentially, nor need the steps be executed only once, unless otherwise specified. Furthermore, the method 700 can be utilized by using one, more than one, and/or all the steps, stages, and/or blocks that are illustrated in FIG. 7. Therefore, the method 700 does not necessarily include a minimum, an optimal, or a maximum number of steps, stages, and/or blocks that are needed to implement the systems, methods, and techniques described herein. For clarity, the method 700 illustrates one embodiment.

At stage 702, the method 700 includes producing a first (or initial) DCR of the monitored equipment. To do so, the method 700 may access a data set (e.g., the data set 616 of FIG. 6) of a plurality of known performance characteristics of the monitored equipment, and the known performance characteristics are based on, or dependent of, initial values of the variables. Continuing with stage 702, the method 700 may access a constraint library (e.g., the constraints 618 of FIG. 6) with a plurality of geometric primitives. Note that at stage 702, the geometric primitives may reflect the initial values of the variables. Still at stage 702, the method 700 may analyze the data set to produce the DCR of the monitored equipment by, for example, performing one or more Boolean operation (e.g., Booleans 1, 2, 3, 4, 5, 6, 7, and so forth) of two or more geometric primitives.

For clarity, examples of the geometric primitives may include: the semicircle 306-1, the semicircle 308-1, and the semicircle 310-1 of FIG. 3A; the semicircle 306-2, the semicircle 308-2, the semicircle 310-2, and the rectangle 312-2 of FIG. 3B; the semicircle 306-3, the semicircle 308-3, the rectangle 312-3, the rhombus 314-3, the rhombus 316-3, and the rectangle 318-3 of FIG. 3C; the circle 406 and the rectangle 408 of FIG. 4; the circle 506-1, the rectangle 508-1, the rhombus 510-1, and the rhombus 512-1 of FIG. 5A; the circle 506-2, the ellipse 514-2, and the ellipse 516-2 of FIG. 5B; using the circle 506-3, the ellipse 514-3, the ellipse 516-3, and the circle 518-3 of FIG. 5C; and the like. Also, as forementioned, examples of the DCRs include: the DCR 320-1 of FIG. 3A, the DCR 320-2 of FIG. 3B, the DCR 320-3 of FIG. 3C, the DCR 410 of FIG. 4, the DCR 520-1 of FIG. 5A, the DCR 520-2 of FIG. 5B, the DCR 520-3 of FIG. 5C, and other DCRs that may not be explicitly illustrated and/or described.

Continuing with stage 702, the method 700 may also determine an operating point of the monitored equipment and may compare the operating point of the monitored equipment to the first DCR of the monitored equipment. Based on the comparison, at stage 702, the method 700 may implement a control action. The control action may include making changes to, for example, a system. Alternatively, the control action may include making no changes to the example system.

Alternatively of implementing a control action, at stage 704, the method 700 may adjust the first DCR based on a present operating condition of the monitored equipment. Therefore, at stage 704, the method 700 may produce a second DCR of the monitored equipment based on adjustments of one or more geometric primitives.

For example, referring to FIGS. 3A, 3B, and/or 3C, the temperature of the turbine of the genset may indicate that the turbine may be operating above its nominal design temperature. As a result, an active power output of the genset may be reduced to, for example, 95% of its nameplate value. Subsequently, at stage 704, the rectangle 312-2 constraint may be adjusted (e.g., may be shrunk) from 1.0 pu to, for example, 0.95 pu.

As another example, still referring to FIGS. 3A, 3B, and/or 3C, a cooler ambient temperature and/or a higher air pressure may indicate that a current limit of the genset may be increased to, for example, 105% of its nameplate value. As a result, the VA rating of the genset may also increase. Subsequently, at stage 704, a radius(i) of the semicircles 306-1, 306-2, 306-3 may increase to, for example, 1.10 pu.

As yet another example, referring to, for example, FIG. 3C, a negative VAr stability region may depend on a voltage at terminals of the genset. As the voltage at the terminals increases, a width of the instability region may become wider. As such, a P-direction/width of the rhombus 314-3 and/or a P-direction/width of the rhombus 316-3 may also become wider.

Therefore, at stage 704, the method 700 may adjust one or more geometric primitives based on value changes of the one or more variables. The adjustment may include a scaling, a move, a rotation, a resizing, a mirroring, a flip, a realignment, a skewing, a combination thereof, and/or so forth of the geometric primitive(s).

At stage 706, the method 700 includes publishing the first or the second DCR. At stage 708, the method 700 includes subscribing the first or the second DCR. Collectively, the first DCR and the second DCR may be referred to as "the DCR." For brevity and clarity, stages 706 and 708 may be described at the same time. In some embodiments, to publish and/or subscribe without having previous knowledge of a particular equipment, the method 700 may be implemented by communicating with the equipment. For example, the method 700 may include requesting information of a description, constraints, and/or a capability region of the equipment. Based on the information, the method 700 may include interpreting the DCR.

In some embodiments, at stages 706 and 708, the method 700 may collect into a package (e.g., a data structure, a serialized data stream, and/or so forth) the DCR and the geometric primitives. The method 700 may then make available the DCR and the geometric primitives to one or more DCR subscribers. For example, a publisher (e.g., a DCR publisher) may be a DER, and a subscriber (e.g., a DCR subscriber) may be a DERMS. In such a case, a controller of the DER may utilize various measurements that may be necessary to calculate the constraints, the geometric primitives, and/or the DCR. Further, the DERMS may be capable to use multiple DCRs of, for example, multiple equipment, to calculate an equal-load-share dispatch. As another example, a publisher may be a DER, and a subscriber may be another DER. As another example, a publisher may be a DERMS (e.g., a DERMS of the genset, a first DERMS of a first equipment), and the subscriber may be another DERMS (e.g., a DERMS of a system, a second DERMS of a second equipment).

Depending on whether the method 700 utilizes the first or the second DCR, at stage 710, the method 700 includes interpreting the DCR. Specifically, the subscriber (e.g., the DERMS, the IED, the genset) may utilize the DCR. For example, a DCR subscriber can use the DCR to calculate margins on a P-direction and a Q-direction between a P, Q operating point (e.g., a present operating point) and a close (or the closest) boundary(ies) of the DCR. Specifically, to calculate a positive P (+P) maneuvering margin, a maneuvering margin calculator (or a maneuvering margin module, not illustrated) may initiate the margin calculation at the P, Q operating point. The method 700 then may include performing a linear search in a +P direction until it reaches a boundary of the DCR. The method 700 may repeat a similar process in a −P, +Q, and −Q direction.

As another example, a DCR subscriber may calculate a larger (or the largest) ellipse. The ellipse may be centered on the present operating point that can be contained within the DCR.

As another example, a DCR subscriber may calculate a margin along a line, the line may be produced (and/or represented, defined, implemented) by connecting an origin of the DCR to the present operating point. An angle of the line may be referred to as the power factor (p.f.). An operating margin may be a length along the line having a constant p.f. between the present operating point and a close (or the closest) boundary of the DCR along the line. By so doing, the method 700 may help indicate an amount of additional load at a present p.f. that a DER may supply in addition to a present load.

It is to be understood that a proper, adequate, and/or correct interpretation of the DCR enables the method 700 to implement a proper, adequate, and/or correct control action. In some embodiments, a control action may be and/or include an alarm or a log that may alert operators or engineers of, for example, a DER, to an excursion of steady state limits of the DER. Further, these excursions may also log the duration of time the DER was operating outside the steady state limits. These alarm and logs may help inform the operators or engineers of the DER regarding future maintenance actions. In some embodiments, staying outside the steady state limit for a considerable long time (e.g., one minute, five minutes, ten minutes) may initiate additional actions, such as load shedding, generator runback, and/or tripping the generator offline. In some embodiments, when a DER (e.g., a genset) momentarily exceeds the transient limit, the method 700 may include initiating an immediate tripping of a circuit breaker of the DER.

Next, the description includes additional example embodiments of the described systems, methods, and techniques for producing and utilizing a capability region (e.g., a DCR) of one or more monitored equipment.

EXAMPLE EMBODIMENTS

Example 1. A system for producing a capability region of a one or more monitored equipment, and the system comprises an intelligent electronic device (IED). The IED comprises at least one computer-readable medium having instructions to access: a data set of a plurality of known performance characteristics of the one or more monitored equipment based on a plurality of variables; and a constraint library comprising a plurality of geometric primitives. The IED further comprises a capability region module that is configured to: analyze the data set; and produce the capability region of the one or more monitored equipment by using one or more geometric primitives of the plurality of geometric primitives, wherein the capability region of the one or more monitored equipment comprises one or more constraints. The IED further comprises a response module that is configured to: determine an operating point of the one or more monitored equipment by using one or more variables of the plurality of variables; and compare the operating point of the one or more monitored equipment with the capability region of the one or more monitored equipment. The IED further comprises a control module that is configured to implement a control action based on the comparison.

Example 2. The system of Example 1, wherein the IED further comprises at least one processor, and the at least one processor executes one or more of: the instructions of the at least one computer-readable medium; the configuration of the capability region module; the configuration of the response module; and the configuration of the control module.

Example 3. The system of Example 1, wherein the plurality of variables comprises one or more of a temperature, an instantaneous current, a root mean square (RMS) current, a fault current, a sequence current, a line current, a neutral current, an instantaneous voltage, an RMS voltage, a line-to-line voltage, a line-to-neutral voltage, a direct current, a quadrature current, a resistance, an inductance, a capacitance, a reactance, an impedance, a conductance, a charge, a frequency, a real power, a reactive power, a complex power, an apparent power, a power factor, a time, a turbine-governor regulation constant, an electrical torque, a mechanical torque, a net accelerating torque, a permittivity, a reflection or refraction coefficient, a magnetic flux, and a magnetic flux linkage.

Example 4. The system of Example 1, wherein: the capability region produces one or more of a steady-state region, a transient-state region, and an unsafe region; and the capability region comprises one or more of a dynamic capability region (DCR), a static capability region (SCR), a capability curve (CC), a capability area, an operating region, and an operating envelope.

Example 5, the system of Example 4, wherein the capability region module if further configured to adjust the DCR based on measurements of the one or more variables of the plurality of variables, and the measurements being performed in real time, near real time, time intervals, or a combination thereof.

Example 6. The system of Example 1, wherein the IED comprises one or more of a distributed energy resource management system (DERMS), a microgrid controller, a real-time automation controller (RTAC), a remote terminal unit, a differential relay, a distance relay, a directional relay, a feeder relay, an overcurrent relay, a voltage regulator control, a voltage relay, a breaker failure relay, a generator relay, a motor relay, a bay controller, a meter, a recloser control, a communication processor, a computing platform, a programmable logic controller (PLC), a programmable logic arrays (PLA), a programmable array logic (PAL), a field-programmable gate array (FPGA), a complex programmable logic device (CPLD), a programmable automation controller, an input and/or an output module, a motor drive, and an adjustable frequency drive (AFD).

Example 7. The system of Example 1, wherein: the one or more monitored equipment comprises a publisher; and the IED comprises a subscriber.

Example 8. The system of Example 1, wherein the control action comprises an alarm, and the alarm comprises an indicator using one or more indicator lights.

Example 9. The system of Example 1, wherein the one or more monitored equipment comprises one or more distributed energy resource (DERs), and wherein the one or more DERs are configured to perform one or more of transferring, producing, converting, consuming, and storing one or more of a real power, an imaginary power, and a complex power.

Example 10. The system of Example 9, wherein the one or more DERs comprise one or more of a genset, a battery energy storage system (BESS), a microgrid point common coupling (PCC), an inverter-based resource, an inter-tie point, a fuel cell, an electric vehicle, an electric vehicle charging station, a solar unit, a power load, an adjustable frequency drive, a first power convertor configured to convert a first direct current (DC) power to a second DC power, a second power convertor configured to convert a first alternating current (AC) power to a third DC power, a third power convertor configured to convert a fourth DC power to a second AC power, and a power frequency converter.

Example 11. The system of Example 1, wherein the one or more monitored equipment further comprises an HMI, and the HMI aids an operator of the system to view the capability region of the monitored equipment.

Example 12. The system of Example 1, wherein each geometric primitive of the plurality of geometric primitives is based on one or more variables of the plurality of variables.

Example 13. The system of Example 12, wherein the one or more geometric primitive of the plurality of geometric primitives is adjusted based on a value change of the one or more variables of the plurality of variables, and wherein the adjustment includes one or more of a scaling, a move, a rotation, a resizing, a mirroring, a flip, a realignment, and a skewing of each geometric primitive of the plurality of geometric primitives.

Example 14. The system of Example 1, wherein the capability region module is further configured to combine at least two geometric primitives of the plurality of geometric primitives to perform one or more of a union, an intersection, and an exclusion of the at least two geometric primitives of the plurality of the geometric primitives.

Example 15. The system of Example 1, wherein the capability region module is further configured to perform one or more Boolean operations using at least two geometric primitives of the plurality of geometric primitives, and wherein the one or more Boolean operations produce the capability region.

Example 16. A computer-implemented method for producing a capability region of one or more monitored equipment, the computer-implemented method comprising: accessing a data set of a plurality of known performance characteristics of the monitored equipment based on a plurality of variables; accessing a constraint library comprising a plurality of geometric primitives; analyzing the data set; producing the capability region of the one or more monitored equipment by performing one or more Boolean operations using one or more geometric primitives of the plurality of geometric primitives, wherein the capability region of the one or more monitored equipment comprises one or more constraints; determining an operating point of the one or more monitored equipment by using one or more variables of the plurality of variables; comparing the operating point of the one or more monitored equipment with the capability region of the one or more monitored equipment; and based on the comparison, implementing a control action.

Example 17. The computer-implemented method of Example 16 further comprising: adjusting one or more geometric primitives of the plurality of geometric primitives based on a value change of one or more variables of the plurality of variables, the adjusting of the one or more geometric primitives of the plurality of geometric primitives comprising: performing one or more of a scaling, a moving, a rotating, a resizing, a mirroring, a flipping, a realigning, and a skewing of the one or more geometric primitives of the plurality of geometric primitives; and based on the adjustment of the one or more geometric primitives of the plurality of geometric primitives, adjusting the capability region of the one or more monitored equipment.

Example 18. The computer-implemented method of Example 16 further comprising publishing the capability region to an intelligent electronic device (IED), wherein: the one or more monitored equipment comprises a publisher; and the IED comprises a subscriber.

Example 19. The computer-implemented method of Example 18 further comprising: interpreting the capability region by utilizing the subscriber, and based on the interpretation of the capability region, implementing the control action.

Example 20. An apparatus comprises: an interface to communicate with one or more equipment using a communication protocol; at least one processor; and at least one computer-readable medium having instructions that, responsive to execution by the at least one processor, cause the apparatus to perform the computer-implemented method of Example 16.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system for producing a capability region of one or more monitored equipment, the system comprising:
an intelligent electronic device (IED) comprising:
at least one computer-readable medium having instructions to access:
a data set including a plurality of known performance characteristics of the one or more monitored equipment based on a plurality of variables; and
a constraint library comprising a plurality of geometric primitives;
a capability region module that is configured to:
analyze the data set; and
produce the capability region of the one or more monitored equipment by using one or more geometric primitives of the plurality of geometric primitives, wherein the capability region of the one or more monitored equipment comprises one or more constraints;
a response module that is configured to:
determine an operating point of the one or more monitored equipment by using one or more variables of the plurality of variables; and
compare the operating point of the one or more monitored equipment with the capability region of the one or more monitored equipment; and
a control module to implement a control action based on the comparison.

2. The system of claim 1, wherein the IED further comprises at least one processor, and the at least one processor executes one or more of:
the instructions of the at least one computer-readable medium;
the configuration of the capability region module;
the configuration of the response module; and
the configuration of the control module.

3. The system of claim 1, wherein the plurality of variables comprises one or more of a temperature, an instantaneous current, a root mean square (RMS) current, a fault current, a sequence current, a line current, a neutral current, an instantaneous voltage, an RMS voltage, a line-to-line voltage, a line-to-neutral voltage, a direct current, a quadrature current, a resistance, an inductance, a capacitance, a reactance, an impedance, a conductance, a charge, a frequency, a real power, a reactive power, a complex power, an apparent power, a power factor, a time, a turbine-governor regulation constant, an electrical torque, a mechanical torque, a net accelerating torque, a permittivity, a reflection or refraction coefficient, a magnetic flux, and a magnetic flux linkage.

4. The system of claim 1, wherein:
the capability region produces one or more of a steady-state region, a transient-state region, and an unsafe region; and
the capability region comprises one or more of a dynamic capability region (DCR), a static capability region (SCR), a capability curve (CC), a capability area, an operating region, and an operating envelope.

5. The system of claim 4, wherein the capability region module if further configured to adjust the DCR based on measurements of the one or more variables of the plurality of variables, and the measurements being performed in real time, near real time, time intervals, or a combination thereof.

6. The system of claim 1, wherein the IED comprises one or more of a distributed energy resource management system (DERMS), a microgrid controller, a real-time automation controller (RTAC), a remote terminal unit, a differential relay, a distance relay, a directional relay, a feeder relay, an overcurrent relay, a voltage regulator control, a voltage relay, a breaker failure relay, a generator relay, a motor relay, a bay controller, a meter, a recloser control, a communication processor, a computing platform, a programmable logic controller (PLC), a programmable logic arrays (PLA), a programmable array logic (PAL), a field-programmable gate array (FPGA), a complex programmable logic device (CPLD), a programmable automation controller, an input and/or an output module, a motor drive, and an adjustable frequency drive (AFD).

7. The system of claim 1, wherein:
the one or more monitored equipment comprises a publisher; and
the IED comprises a subscriber.

8. The system of claim 1, wherein the control action comprises an alarm, and the alarm comprises an indicator using one or more indicator lights.

9. The system of claim 1, wherein the one or more monitored equipment comprises one or more distributed energy resources (DERs), and wherein the one or more DERs are configured to perform one or more of transferring, producing, converting, consuming, and storing one or more of a real power, an imaginary power, and a complex power.

10. The system of claim 9, wherein the one or more DERs comprise one or more of a genset, a battery energy storage system (BESS), a microgrid point common coupling (PCC), an inverter-based resource, an inter-tie point, a fuel cell, an electric vehicle, an electric vehicle charging station, a solar unit, a power load, an adjustable frequency drive, a first power convertor configured to convert a first direct current (DC) power to a second DC power, a second power convertor configured to convert a first alternating current (AC) power to a third DC power, a third power convertor configured to convert a fourth DC power to a second AC power, and a power frequency converter.

11. The system of claim 1, wherein the one or more monitored equipment further comprises a human-machine interface (HMI), and the HMI aids an operator of the system to view the capability region of the monitored equipment.

12. The system of claim 1, wherein each geometric primitive of the plurality of geometric primitives is based on the one or more variables of the plurality of variables.

13. The system of claim 12, wherein the one or more geometric primitive of the plurality of geometric primitives is adjusted based on a value change of the one or more variables of the plurality of variables, and wherein the adjustment includes one or more of a scaling, a move, a rotation, a resizing, a mirroring, a flip, a realignment, a skewing, a squeeze, a reflection, an orthogonal projection, and a perspective projection of each geometric primitive of the plurality of geometric primitives.

14. The system of claim 1, wherein the capability region module is further configured to combine at least two geometric primitives of the plurality of geometric primitives to perform one or more of a union, an intersection, and an exclusion of the at least two geometric primitives of the plurality of the geometric primitives.

15. The system of claim 1, wherein the capability region module is further configured to perform one or more Boolean operations using at least two geometric primitives of the plurality of geometric primitives, and wherein the one or more Boolean operations produce the capability region.

16. A computer-implemented method for producing a capability region of one or more monitored equipment, the computer-implemented method comprising:

accessing a data set including a plurality of known performance characteristics of the monitored equipment based on a plurality of variables;
accessing a constraint library comprising a plurality of geometric primitives;
analyzing the data set;
producing the capability region of the one or more monitored equipment by performing one or more Boolean operations using one or more geometric primitives of the plurality of geometric primitives, wherein the capability region of the one or more monitored equipment comprises one or more constraints;
determining an operating point of the one or more monitored equipment by using one or more variables of the plurality of variables;
comparing the operating point of the one or more monitored equipment with the capability region of the one or more monitored equipment; and
based on the comparison, implementing a control action.

17. The computer-implemented method of claim 16 further comprising:
adjusting one or more geometric primitives of the plurality of geometric primitives based on a value change of one or more variables of the plurality of variables, the adjusting of the one or more geometric primitives of the plurality of geometric primitives comprising:
performing one or more of a scaling, a moving, a rotating, a resizing, a mirroring, a flipping, a realigning, and a skewing of the one or more geometric primitives of the plurality of geometric primitives; and
based on the adjustment of the one or more geometric primitives of the plurality of geometric primitives, adjusting the capability region of the one or more monitored equipment.

18. The computer-implemented method of claim 16 further comprising publishing the capability region to an intelligent electronic device (IED), wherein:
the one or more monitored equipment comprises a publisher; and
the IED comprises a subscriber.

19. The computer-implemented method of claim 18 further comprising:
interpreting the capability region by utilizing the subscriber; and
based on the interpretation of the capability region, implementing the control action.

20. An apparatus comprises:
a communication interface to communicate with one or more equipment using a communication protocol;
at least one processor; and
at least one computer-readable medium having instructions that, responsive to execution by the at least one processor, cause the apparatus to perform the computer-implemented method of claim 16.

* * * * *